US012497944B1

(12) United States Patent
Giannotta et al.

(10) Patent No.: US 12,497,944 B1
(45) Date of Patent: Dec. 16, 2025

(54) POWER GENERATION APPARATUS

(71) Applicants: Eugene Giannotta, Naples, FL (US); Joseph Miller, Magnolia, TX (US)

(72) Inventors: Eugene Giannotta, Naples, FL (US); Joseph Miller, Magnolia, TX (US)

( * ) Notice: Subject to any disclaimer, the term of this patent is extended or adjusted under 35 U.S.C. 154(b) by 0 days.

(21) Appl. No.: 19/087,502

(22) Filed: Mar. 22, 2025

(51) Int. Cl.
*F03D 1/04* (2006.01)
*F03D 13/20* (2016.01)

(52) U.S. Cl.
CPC ............. *F03D 1/044* (2023.08); *F03D 1/053* (2023.08); *F03D 13/201* (2023.08)

(58) Field of Classification Search
CPC .... F03D 1/044; F03D 1/053; F05B 2240/133; F05B 2250/5012
See application file for complete search history.

(56) References Cited

U.S. PATENT DOCUMENTS 4,324,985 A * 4/1982 Oman ....................... F03D 7/02 290/55
2007/0231118 A1* 10/2007 Krippene .................. F03D 9/34 415/4.2
2011/0198855 A1* 8/2011 White ....................... F03D 9/25 290/55
2013/0341930 A1* 12/2013 Campagna ................ F03D 1/02 415/17

FOREIGN PATENT DOCUMENTS

FR 1011132 * 6/1952
GB 2417758 * 3/2006
GB 2417758 A * 3/2006 ............... F03D 3/02
WO WO-2010150030 A2 * 12/2010 ............. F03D 9/007
WO WO-2012000444 A1 * 1/2012 ........... F03D 7/0268

OTHER PUBLICATIONS

Translation of FR1011132 (Year: 1952).*

* cited by examiner

*Primary Examiner* — Brian O Peters
(74) *Attorney, Agent, or Firm* — Sue C. Watson; Southern Plains IP Law PLLC

(57) ABSTRACT

A power generation apparatus includes a wind turbine unit including a first end and having one or more wind turbine blade units rotatably carried therein which are activated to rotate by wind/airflow moving therethrough. Each of the one or more turbine blade units is operably connected to a generator to generate electricity when the one or more wind turbine blade units rotate. An inlet funnel is axially aligned with the first end of the wind turbine unit when in an operative position. The inlet funnel is pivotally carried to pivot out of the operative position when wind/airflow increases excessively so that at least a portion of the wind/airflow is redirected and reduced from entering the wind turbine unit.

20 Claims, 29 Drawing Sheets

POWER GENERATION APPARATUS

TECHNICAL FIELD

The present invention discloses a power generation apparatus, where power is generated when various components connected to a generator are moved by wind/air flow to produce an electric current.

BACKGROUND

Wind is currently used to rotate generators to produce electricity. However, at least an average annual wind speed of nine (9) miles per hour (mph) to thirteen (13) mph is typically the minimum recommended in order to justify the purchase, installation, and maintenance of wind power generation equipment. In a number of regions, the annual average wind speed is below the above-referenced recommendation.

Further, wind power generation equipment required to harness adequate wind speed may be costly to buy, install, and maintain. While wind power generation equipment may be affordable for some industrial or commercial applications, the price of the equipment as well as the cost of installation, operation, and maintenance may be beyond what other government, industrial, commercial, or residential users are willing to pay or could afford.

There is a need for wind power generation equipment that is capable of harnessing lower average annual wind speeds. In addition, there is a need for wind power generation equipment that can accelerate lower wind speeds to higher wind speeds, so that more energy is available from the wind that may be harnessed for use. Further, there is a need to provide wind power generation equipment that is economically feasible for purchase, installation, operation, and maintenance, and for installation and use on governmental lands, in commercial or industrial locations, in residential locations, and the like.

SUMMARY

In one embodiment, a power generation apparatus comprises at least one wind turbine unit including a first end and an opening formed therethrough having one or more wind turbine blade units rotatably carried within the wind turbine unit. The one or more wind turbine blade units are configured to rotate when wind/airflow moves through the wind turbine unit. Each wind turbine blade unit of the one or more wind turbine blade units is operably connected to a generator to generate electricity when the one or more wind turbine blade units rotate. The power generation apparatus also includes an inlet funnel which is axially aligned with the with the first end of the wind turbine unit when the inlet funnel is in the operative position and pivotally carried to move into and out of the operative position relative to the first end of the wind turbine unit. The inlet funnel is formed to remain in the operative position until increased air flow against a portion of the inlet funnel causes the inlet funnel to pivot out of axial alignment and out of the operative position such that at least a portion of the wind/airflow is redirected and reduced from entering the wind turbine unit.

In one aspect of the embodiment, the one or more wind turbine blade units further comprises at least two wind turbine blade units, and at least one wind turbine blade unit of the at least two wind turbine blade units includes a diffuser positioned axially in front of the at least one turbine blade unit of the two wind turbine units. The at least two wind turbine blade units are rotatably mounted on a central shaft which operably connects to the generator.

In another aspect of the embodiment, the wind turbine unit further comprises a second end, and the power generation apparatus includes an outlet funnel aligned with the second end of the wind turbine unit. The outlet funnel is pivotally connected to the wind turbine unit.

In yet another aspect of the embodiment, a sail is positioned over at least a portion of an opening in the inlet funnel. When excessive wing/airflow contacts the sail, the pressure of the wind/airflow against the sail and inlet funnel causes the inlet funnel to pivot out of axial alignment with the wind turbine unit. The sail is used to calibrate pivotal movement of the inlet funnel with respect to the wind turbine unit via the number of openings in the sail, the location of the sail relative to the inlet funnel, and the amount of the sail used with inlet funnel.

In still another aspect of the embodiment, one or more air foils are mounted adjacent to the second end of the wind turbine unit.

In still a further aspect of the embodiment, one or more wind turbine units are carried on a horizontal support arm. The horizontal support arm is carried by a tower. The horizontal support arm is connected to a hub which rotates on a bearing plate. The hub and the bearing plate are carried by the tower. The horizontal support arm further comprises at least one rudder. The horizontal support arm is operably connected to a landing gear.

In another aspect of the embodiment, the one or more wind turbine blade units are rotatably mounted on a central shaft with operably connects to the generator, and a conductor extends from each generator to an upper portion of a single slip ring used with each horizontal support arm.

In yet another aspect of the embodiment, at least one of the inlet funnel and the wind turbine unit includes a diffuser. The diffuser is formed to include a plurality of openings. The diffuser turns wind/airflow with vortices into laminar airflow. The diffuser is used to increase or decrease wind/airflow.

In a further aspect of the embodiment, the inlet funnel is pivotally connected to the wind turbine unit.

BRIEF DESCRIPTION OF THE DRAWINGS

The structure, operation, and advantages of the present invention will become further apparent upon consideration of the following description taken in conjunction with the accompanying figures. The figures are intended to be schematic, illustrative, and not limiting:

FIG. 12 is a perspective view of a hub that the horizontal support arms of FIG. 11 are attached to;

DETAILED DESCRIPTION

Figure 1:
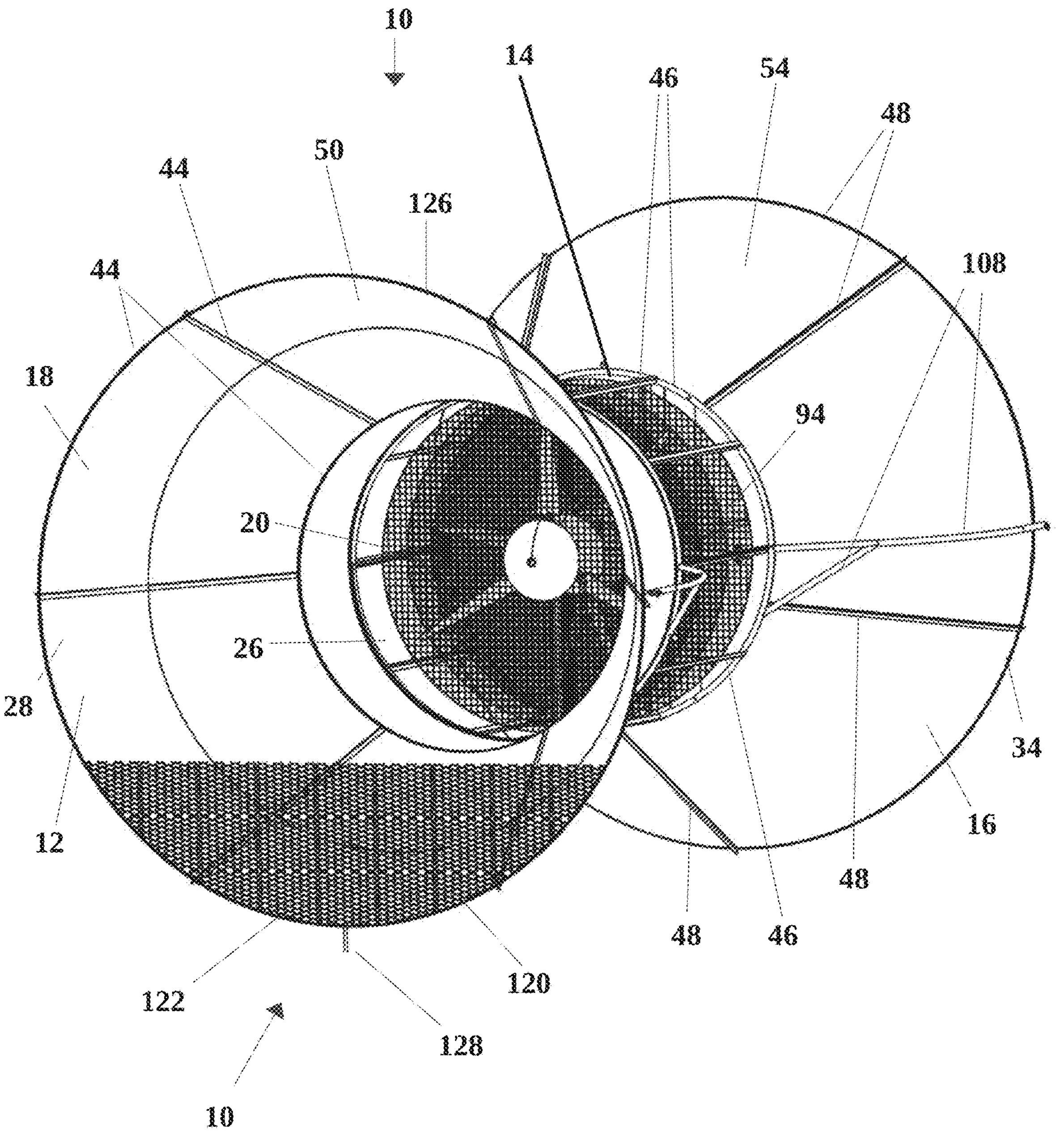
FIG. 1 is a front perspective view of power generation apparatus, showing the wind turbine unit without sidewalls only to better illustrate the wind turbine blade units, according to the present invention.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the," are intended to mean that there are one or more of the elements. The terms "comprising," "including," and "having" are intended to be inclusive and mean that there may be additional elements other than the listed elements. The variations of "comprising", "including" and "having", such as, but not by way of limitation, "comprise", "include", "have" or "has", are also included in this definition, as are the words "is" and "are". Any examples of operating parameters and/or environmental conditions are not exclusive of other parameters/conditions of the disclosed embodiments.

The present invention relates to a power generating apparatus wherein power is generated by wind and airflow. The term "wind" as used herein, means a natural movement of air of any speed/velocity. "Air flow" or "airflow" as used herein, means "wind" as defined above, but also means air produced by other means, such as an exhaust of air from other electrical and/or mechanical components of any mechanism.

For example, an exhaust from another device may produce airflow, but not wind. However, as used herein, both wind and/or airflow may be used to activate the power generation apparatus, and therefore this is why these two terms may be used interchangeably. The present power generation apparatus is desirably designed to accelerate low wind/airflow to a higher speed or velocity, so that sufficient power may be extracted from the wind/air flow for electric power generation. Components of the power generation apparatus may also be used to protect portions thereof during strong winds. Some wind generation equipment includes air turbine blades, similar to the historically well-known windmills. In the present invention, an inlet funnel is used to gather and direct wind/airflow into an enclosed wind turbine unit. In the present example, but not by way of limitation, three turbine blades units (each turbine blade unit carrying three turbine blades) is operably connected to a generator. The turbine blade units are spaced-apart and axially aligned, so that wind/airflow not used by a first turbine blade unit flows to a second turbine blade unit behind it for use, and the wind/airflow from the second turbine blade unit not used flows to a third turbine blade unit for use. Air foils at an end of the wind turbine unit assist in moving wind/airflow through the wind turbine unit and as does the outlet funnel. As noted previously herein, an annual average wind speed of 9-13 mph is typically recommended to harvest electricity from the wind/airflow. Now, for example, but not by way of limitation, wind/airflow at six (6) miles per hour (mph) is increased by a factor of 2 to 5, so that the 6 mph unusable airflow now flows at 12 mph (×2) mph, 18 mph (×3) mph, 24 mph (×4) mph, or 30 mph (×5) mph, so that a 6 mph wind/airflow that was previously considered unusable for electric generation now may become adequate to optimal for electric generation. Many conventional wind generation machines harness only a portion of the wind/airflow, that is, around 40 percent. The present invention is capable of harnessing approximately 70 percent or more of the wind/airflow which passes through its components, which cooperate to increase the wind/airflow so that a greater amount of electricity may be produced. The term "approximately", as used herein, means plus or minus 5 percent of the value stated in the example in which it is used. Additional features are shown and/or described herein.

Figure 2:
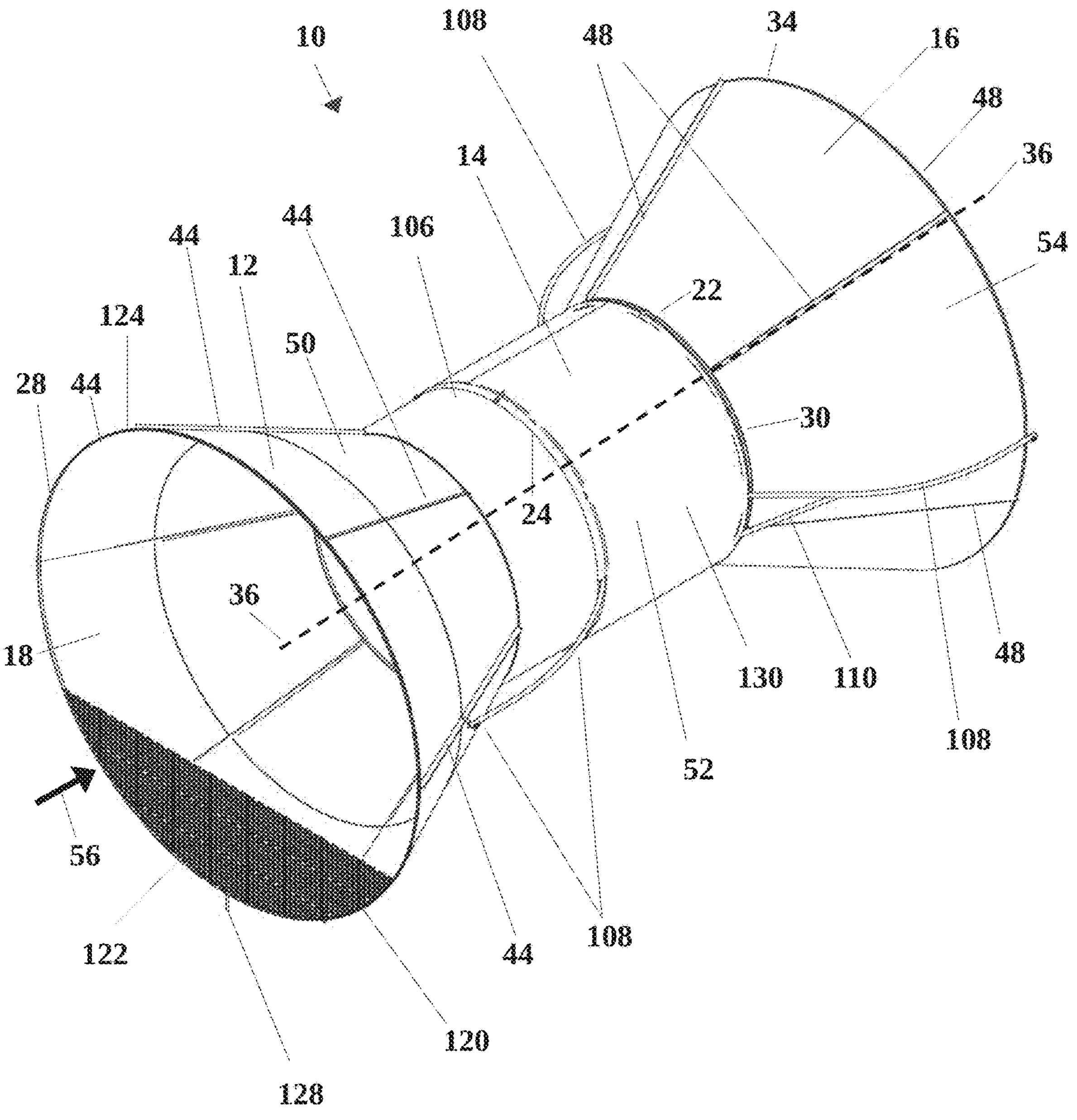
FIG. 2 a side perspective view of the power generation apparatus of FIG. 1, but illustrating the sidewalls covering the wind turbine unit.
Figure 3:
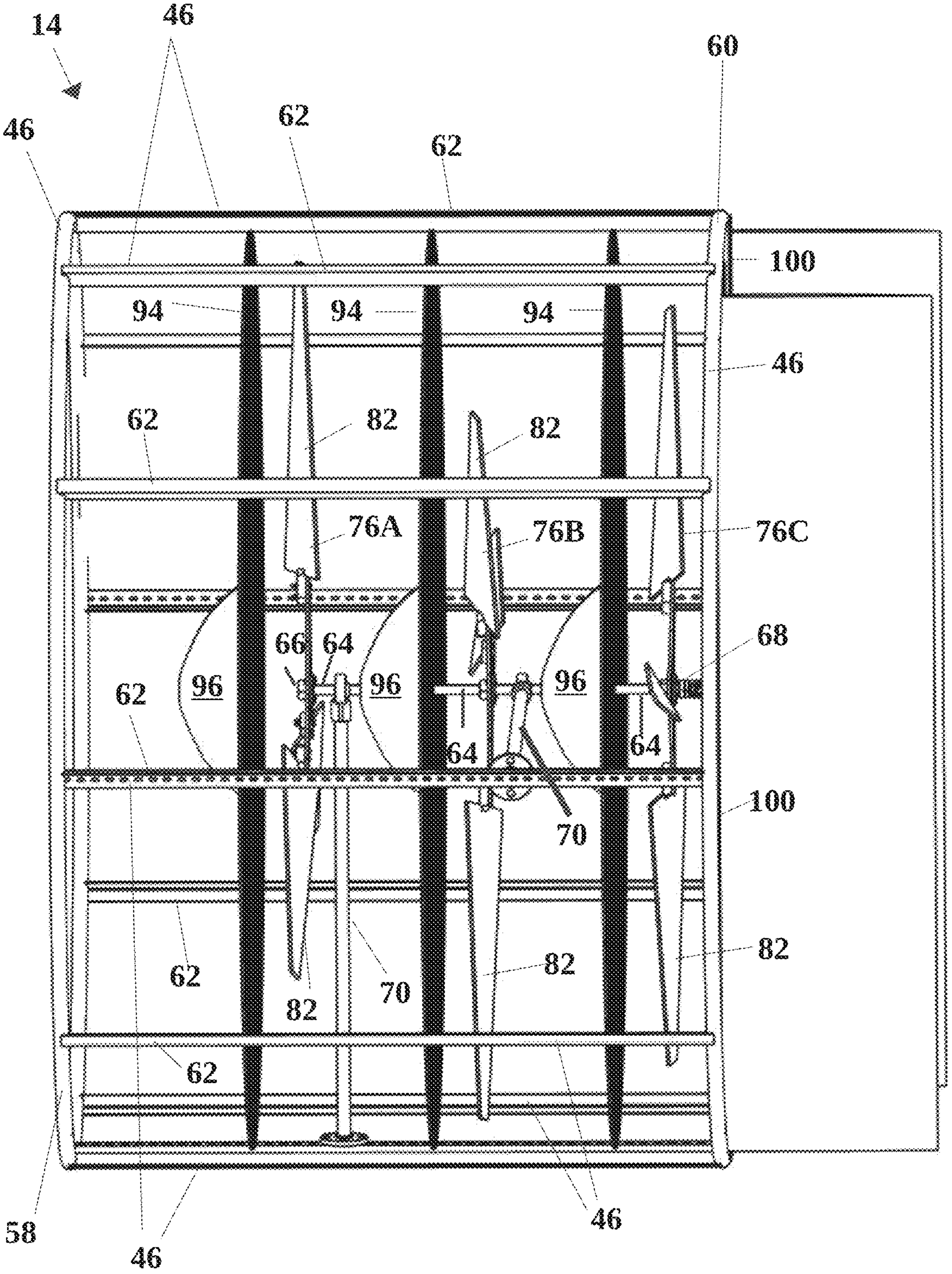
FIG. 3 is a side view of the wind turbine unit of FIG. 1 without sidewalls.
Figure 4:
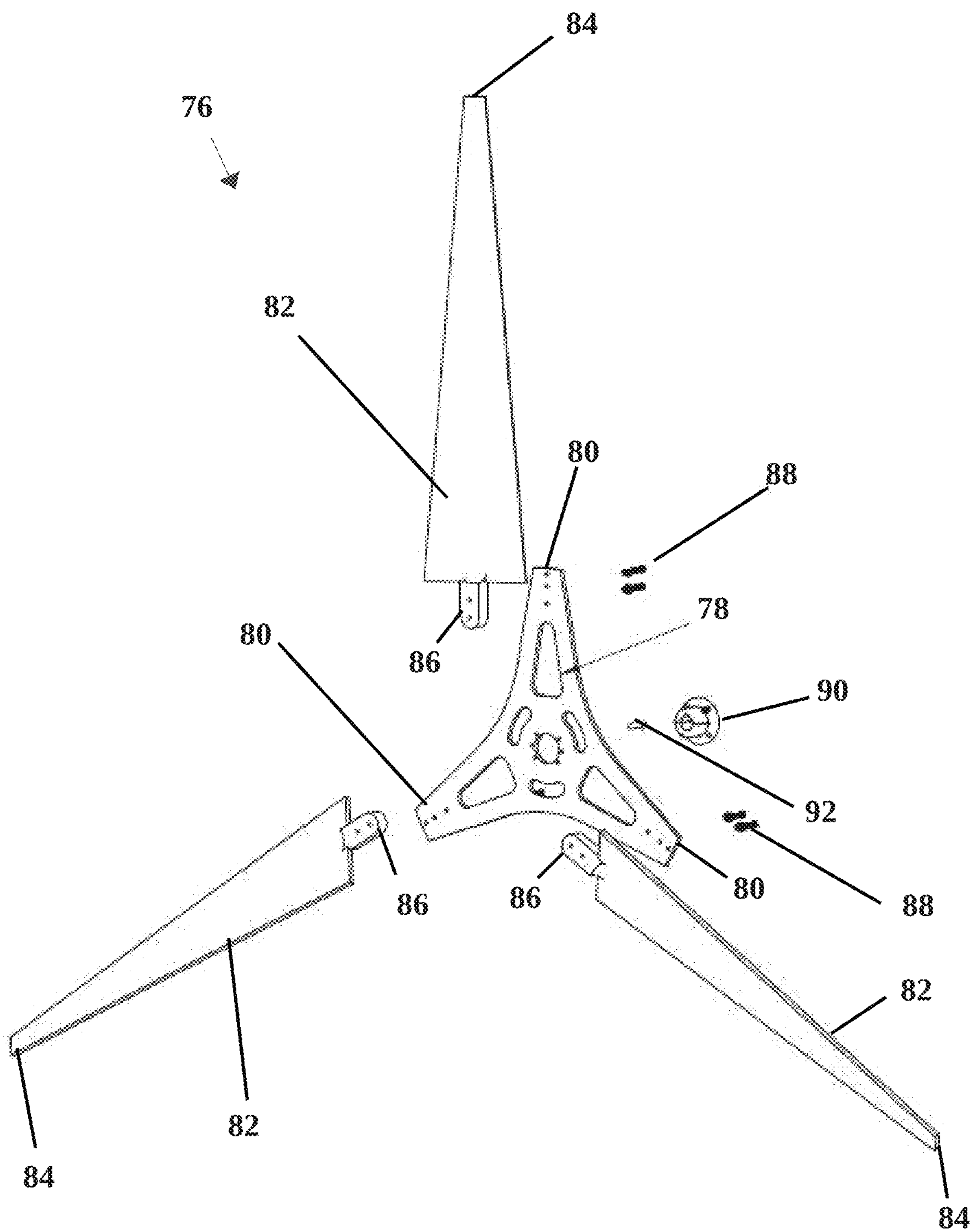
FIG. 4 is an exploded view of a wind turbine blade unit of FIGS. 1 and 3.
Figure 5:
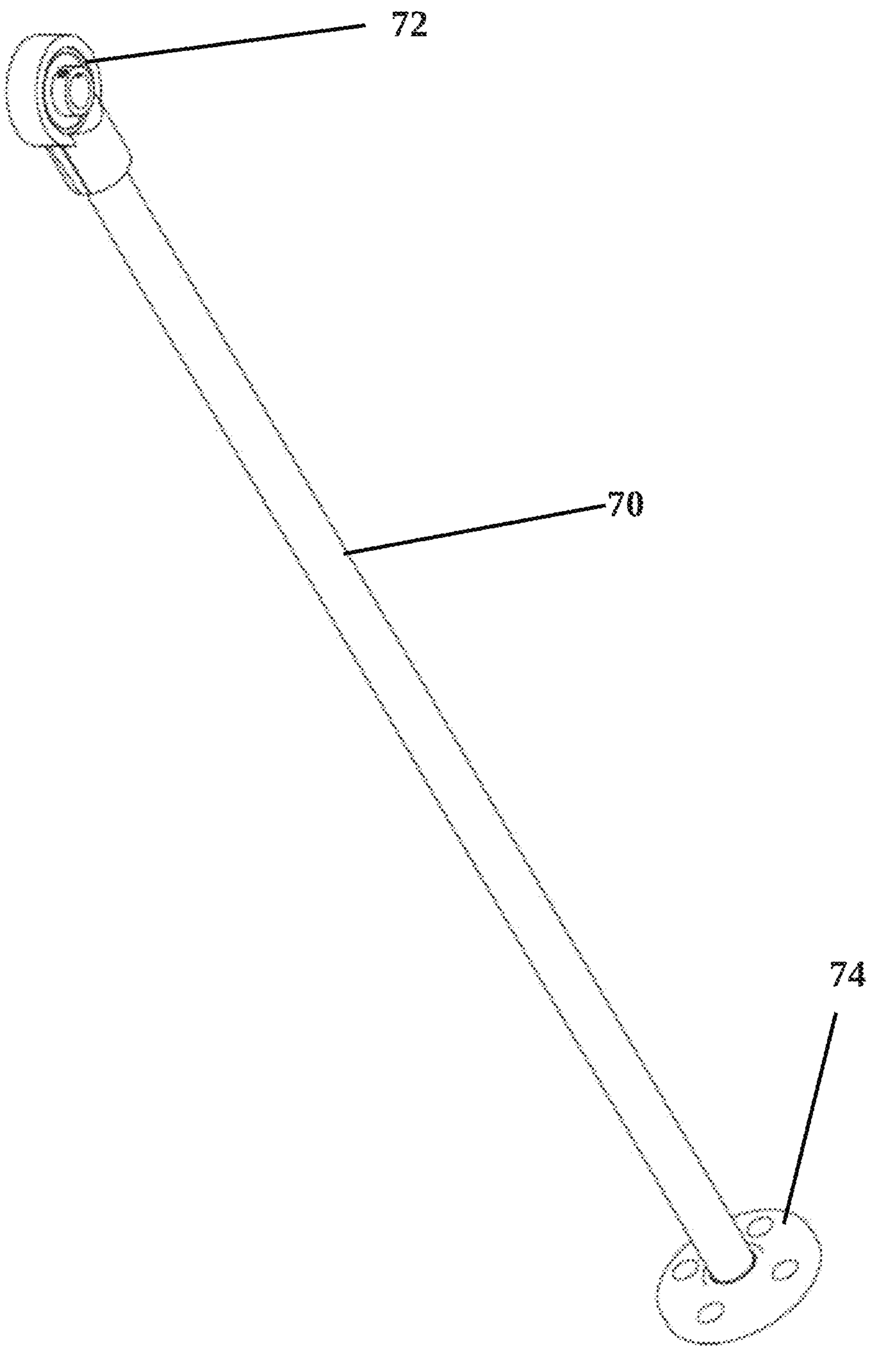
FIG. 5 is a perspective view of one support shaft shown in FIG. 3.
Figure 6:
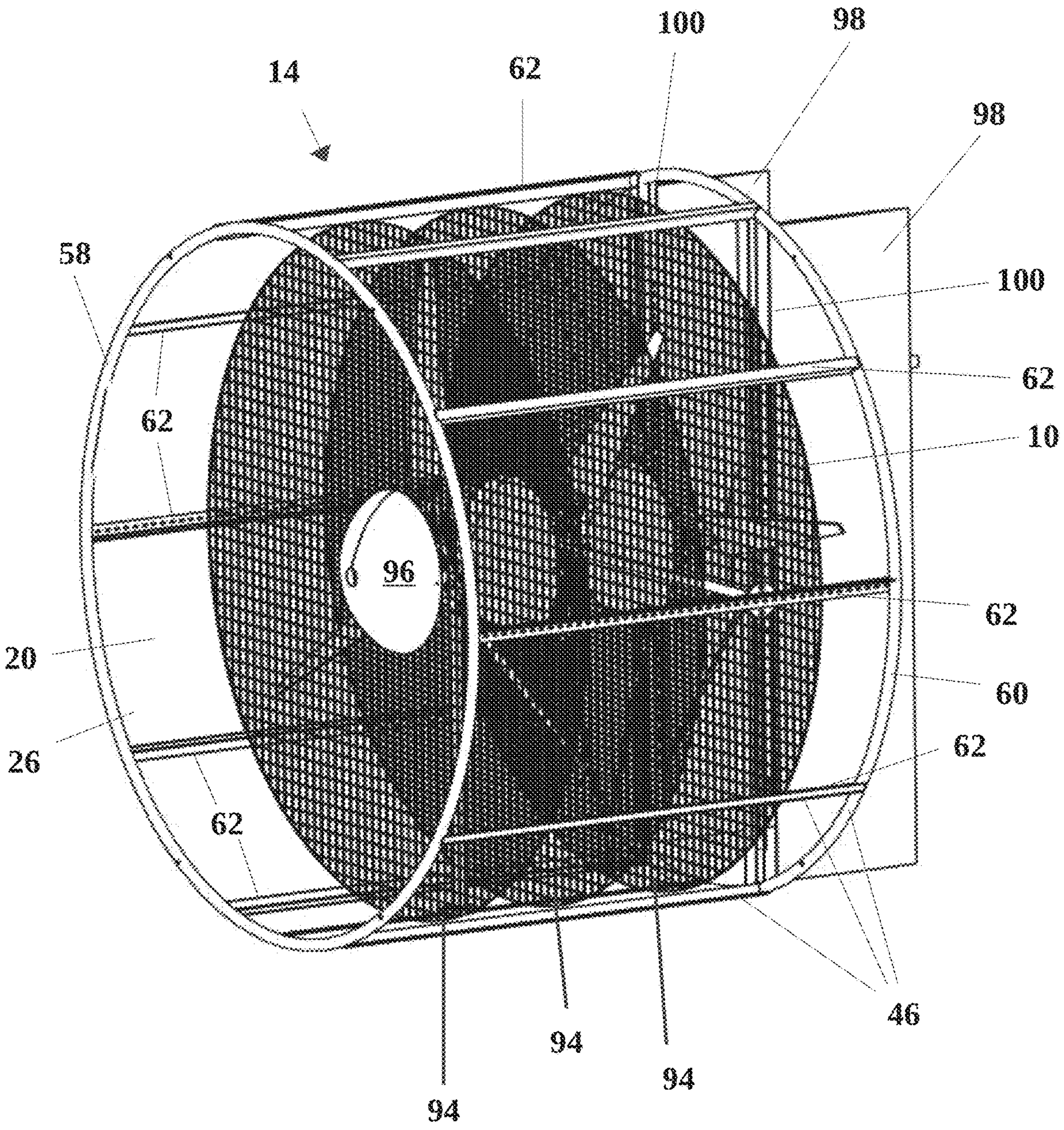
FIG. 6 is a side perspective view of the wind turbine unit without sidewalls for illustration purposes only, as shown in FIG. 1.

A power generation apparatus 10 as shown in FIGS. 1 and 2 desirably may include an inlet funnel 12, a wind turbine unit 14, and an outlet funnel 16, each with an opening 18, 20, 22, respectively therethrough. At least a portion of the inlet funnel 12 and the outlet funnel 16, respectively, may be, but not by way of limitation, in a frusto-conical or funnel shape. A narrow end 24 of the inlet funnel 12 may desirably be positioned at an entrance 26 of and opening 20 to the wind turbine unit 14, while the wide end 28 of the inlet outlet 16 is positioned opposite thereof. A narrow end 30 of the outlet funnel 16 may desirably be positioned next to the exit end 32 of the wind turbine unit 14. The ring/wide end 34 of the outlet funnel 16 is positioned opposite the narrow end 30. A full or partial gasket 25 may be affixed to the narrow end 24 of the inlet funnel 12 to keep wind/airflow from escaping through the connection between the narrow end 30 of the inlet funnel 12 and the entrance opening 20 of the wind turbine unit 12, or a full or partial gasket (not shown) may be affixed to the entrance opening 20 of the wind turbine unit 12. The wind turbine unit 14 may desirably be formed in a tubular shape. Desirably, the inlet funnel 12, the wind turbine unit 14, and the outlet funnel 16 are aligned in an axial alignment with a central axis 36. The inlet funnel 12, the wind turbine unit 14, and the outlet funnel 16 may have any shape or combination of shapes, so long as the inlet funnel 12, the wind turbine unit 14, and the outlet funnel 16 operate as shown and/or described herein.

Figure 11:
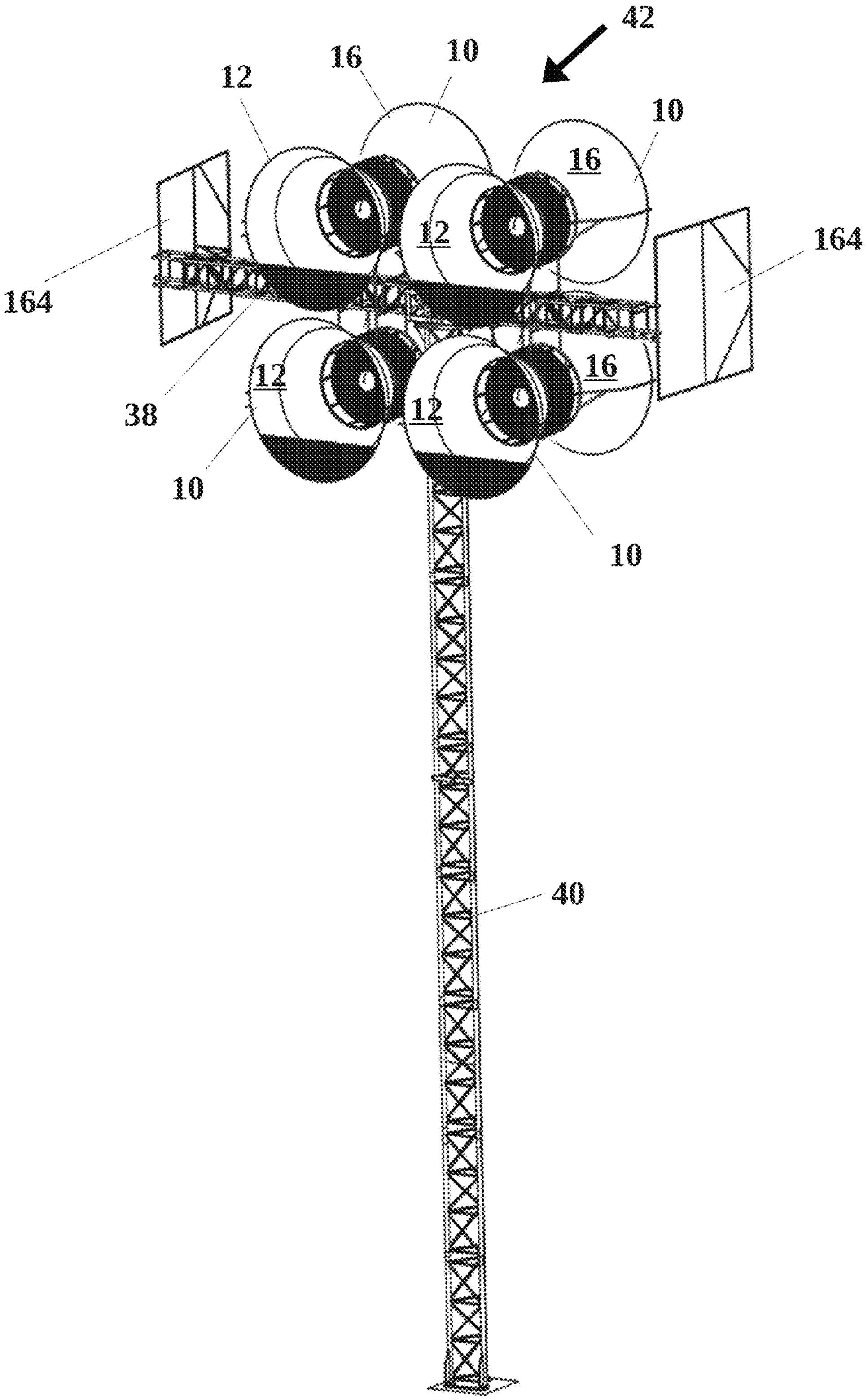
FIG. 11 is a front perspective view of four power generation apparatus connected to a horizontal support arm which is carried by a tower, the wind generation units are shown without sidewalls for illustrative purposes only.

Desirably, at least one power generator apparatus 10 may be connected to at least one horizontal support arm 38, and the horizontal support arm 38 may be operably connected to a tower 40. This combination may comprise a power generation system 42, as illustrated in FIG. 11. The inlet funnel 12, the wind turbine unit 14, and the outlet funnel 16 may have any shape or combination of shapes, so long as the inlet funnel 12, the wind turbine unit 14, and the outlet funnel 16 operate as shown and/or described herein.

The inlet funnel 12, the wind turbine unit 14, and the outlet funnel 16 each may include a support structure 44, 46, and 48, respectively. Desirably, the inlet 12, the wind turbine unit 14, and the outlet funnel 16 each may include sidewalls 50, 52, and 54, respectively, which cooperate with the support structures 44, 46, 48 of their respective inlet funnel 12, wind turbine unit 14, and outlet funnel 16, to provide wind/air flow 56 therethrough. One or more of the sidewalls 50, 52, 54 may be carried outside of the support structure 44, 46, 48, of the inlet funnel 12, the wind turbine unit 14, and the outlet funnel 16. One example is the outer sidewall 52 of the wind turbine unit 14, as shown in FIG. 2. Other examples show support structure 44, 48, respectively, of the inlet funnel 12 and the outlet funnel 16, which appears on both sides of the sidewalls 50, 54, as shown in FIG. 1. The sidewalls 50, 52, 54 of the inlet funnel 12, the wind turbine unit 14, and the outlet funnel 16 may be formed with a smooth surface or coating or covering on inner surfaces (not shown), so that wind/airflow drag is reduced. The sidewalls 50, 52, 54 may also be a lightweight covering formed from a plastic or polymer that is stretched over the support structure to form each of the sidewalls 50, 52, 54. In any event, the sidewalls 50, 52, 54 may be formed from polymer, plastic, metal, or any material or combination of materials known in the art and commercially available. One or more sidewalls 50, 52, 54 may also include outer surfaces, coatings, and/or coverings to protect the sidewalls 50, 52, 54 from snow, ice, and other harsh weather conditions. Such materials are known in the art and are commercially available.

Turning to FIGS. 1-7, the wind turbine unit 14 may desirably be formed, but not by way of limitation, is desirably cylindrical or tubular in shape and its support structure 46 desirably may include an inlet frame ring 58 and an outlet frame ring 60 which are spaced apart and supported by a plurality of frame rods 62. The wind turbine unit 14 may include a central axis shaft 64 aligned with the central axis 36. The inlet frame 12, the wind turbine unit 14, and the outlet frame 16 are desirably axially aligned on the central axis when in an operative position. The central axis shaft 64 of the wind turbine unit 14 desirably includes a free end 66 positioned near the entrance 26 thereof and an opposite end 68 operably connected to at least one generator. Desirably, a universal joint may be connected to the opposite end 68 of the central axis shaft 64 and to an input shaft of the generator (not shown). Universal joints are known in the art and commercially available. The central axis shaft 64 may desirably be supported by one or more support shafts 70 which extend between and connect to the central axis shaft 64 via a bearing 72 thereon and one or more frame rods 62 or support structure(s) 46 via a flange mount 74. One or more turbine blades units 76 are rotatably held by the central axis shaft 64. Each turbine blade unit 76 may include a hub 78 having one or more, and this example, but not by way of limitation, three blade mounts 80. Each blade mount 80 is formed to connect to one turbine blade 82. Each turbine blade 82 may include a free end 84 and a mounting end 86. In this non-limiting example, one of each of the turbine blades 82 connects via its mounting end 86 to one of each of the blade mounts 80, respectively, of the hub 78 via fasteners 88. A bushing 90 having a machine key 92 permits the hub 78 to be connected to the central axis shaft 64. Other configurations of turbine blade units are possible, and all known and commercially available may be used, so long as they operate as shown and/or described herein.

Three turbine blade units **76*a*, 76*b*, 76*c* may be rotationally mounted on the central axis shaft 64 in a spaced-apart configuration. The turbine blades 82 of the second turbine blade unit 76*b* may desirably be positioned at 60-degree intervals with respect to the turbine blades 82 of the first turbine blade unit 76*a*. Similarly, the turbine blades 82 of the third turbine blade unit 76*c* may also be positioned at 60-degree intervals with respect to the second turbine blade unit 76*b*. It will be appreciated that other intervals of the spacing of turbine blades 82 between two or more turbine blade units are also possible and are known to those having skill in the art. Similarly, any shape or any configuration of turbine blades 82 known in the art may be used. In addition, any number of turbine blades per turbine blade unit, or any number of turbine blade units may be used as well, so long as the power generation apparatus 10** functions as shown and/or described herein.

The turbine blades 82 of each turbine blade unit 76*a*, 76*b*, 76*c* may desirably be rotated by the passage of wind/airflow through the first, second, and third turbine blade units 76*a*, 76*b*, 76*c*, respectively. Alternatively, an electric motor may be operably connected to the central axis shaft 64 to at least start the rotation of the respective first, second, and third turbine blade units 76*a*, 76*b*, 76*c*.

The turbine blade units 76*a*, 76*b*, 76*c* each use a percentage of the wind/airflow introduced through the inlet funnel 12. For example, the first turbine blade unit 76*a* may desirably use 40 percent of the total (100 percent) wind/airflow introduced into the wind turbine unit 14 and the first turbine blade unit 76*a*. The second turbine blade unit 76*b* may use 40 percent of the remaining wind/airflow (approximately 20-24 percent) after it has passed through the first wind turbine unit 76*a*. The third turbine blade unit 76*c* may use about 40 percent of the wind/airflow remaining after passing through the second turbine blade unit 76*b* (approximately 10-14 percent). So approximately 70 percent or more of the energy from the wind/airflow is harvested. As noted below, one or more diffusers may be used to further control wind/airflow through the wind turbine unit 14.

The wind turbine unit 14 may include, but not by way of limitation, one or more diffusers 94 which may be desirably positioned in front of each of the first, second, and third turbine blade units 76*a*, 76*b*, 76*c*, respectively. The diffusers 94 may desirably be positioned at least between the first turbine blade unit 76*a* and the second turbine blade unit 76*b*, and between the second turbine blade unit 76*b* and the third turbine blade unit 76*c*. The wind/airflow 56 that exits from the first turbine blade unit 76*a* contains vortexes, which is less efficient air flow for power generation, and vortexes may also cause an increase in vibrations, resulting in damage or malfunction to one or more components of the wind turbine unit 14. The diffusers 94 desirably may turn vortex wind/airflow into more desirable laminar airflow which is more efficient for power generation. A diffuser 94 may be positioned in front of the first turbine blade unit 76*a* so that the first turbine blade unit 76*a* does not experience vortex air flow, and such a diffuser 94 in this location (and other locations in the wind turbine unit 14) also work to limit excessive speed wind/airflow 56 from entering or passing through the wind turbine unit 14, because the size and number of apertures of the diffuser limit how much wind/airflow 56 can flow through a diffuser at any given time. Additionally, the first diffuser 94 positioned in front of the first turbine blade unit 76*a* may also be used to keep animals and insects out of the wind turbine unit 14 (such as birds, bats, bees, and the like) as well as refuse carried by the wind/airflow 56.

It will be appreciated that one or more of the diffusers 94 may permit more or less air flow through each of the turbine blade units 76*a*, 76*b*, 76*c*. The diffusers 94 desirably have openings formed through a metal or plastic or polymer, such as, for example, but not by way of limitation, mesh, grille, vent pattern, or repeated design, and/or any material(s) known the art that permit the diffusers 94 to function as shown and/or described herein. The location of the openings may be varied to in the diffusers 94. For example, rather than a consistent mesh pattern shown herein, the diffusers 94 may be formed to have many openings formed near the free ends 84 of the turbine blades 82, and few or no openings formed near the hub 78 of each turbine blade unit 76*a*, 76*b*, 76*c*. The pattern of openings in each diffuser 94 may be varied in number and location in order to better calibrate and harness wind/airflow through the wind turbine blade units 76*a*, 76*b*, 76*c*. The diffusers 94, or any air flow regulators, that permit either greater wind/airflow or less wind/airflow may be used and adjusted for local wind and weather conditions, as well as seasonal conditions.

A convex plate 96 is desirably mounted in front of each blade mount 80 or in front of the diffusers 94. The convex plate 96 desirably may direct the wind/airflow onto the turbine blades 82 of each of the turbine blade units 76*a*, 76*b*, 76*c*. Any shape or size of convex plate may be used, so long as it functions as shown and/or described herein. The convex plate 96 may be constructed from metal, plastic, polymer, or any material that permits the turbine blade units to function as shown and/or described herein.

The outlet frame ring 60 of the wind turbine unit 14 includes one or more air foils 98 connected via one or more bracket(s) or other fastener(s), (not shown) to the outlet frame ring 60 and/or the support structure 46 connected to the outlet frame ring 60 of the wind turbine unit 14.

Figure 7:
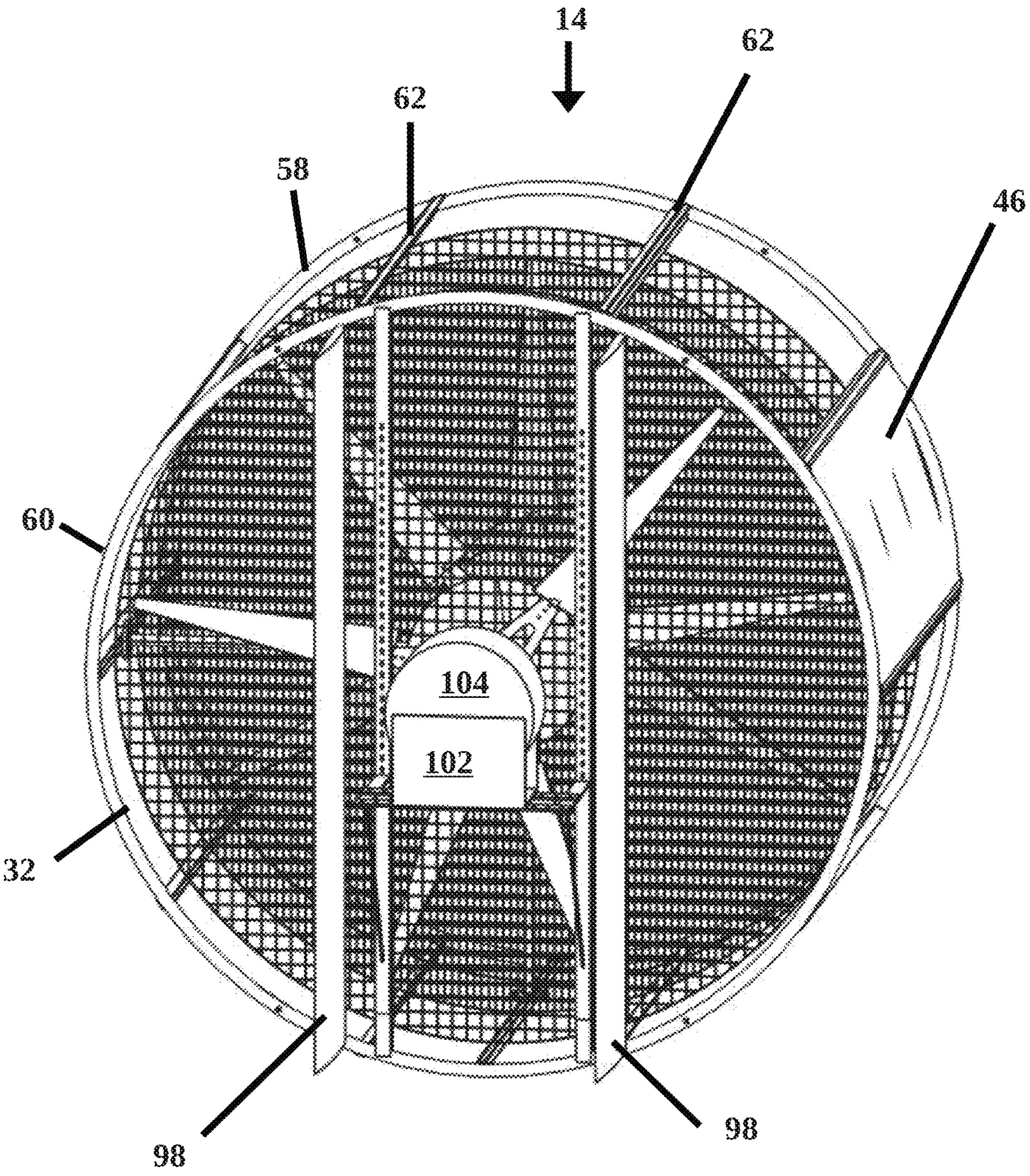
FIG. 7 is a rear perspective view of the wind turbine unit without sidewalls for illustration purposes only, as shown in FIG. 1.
Figure 8:
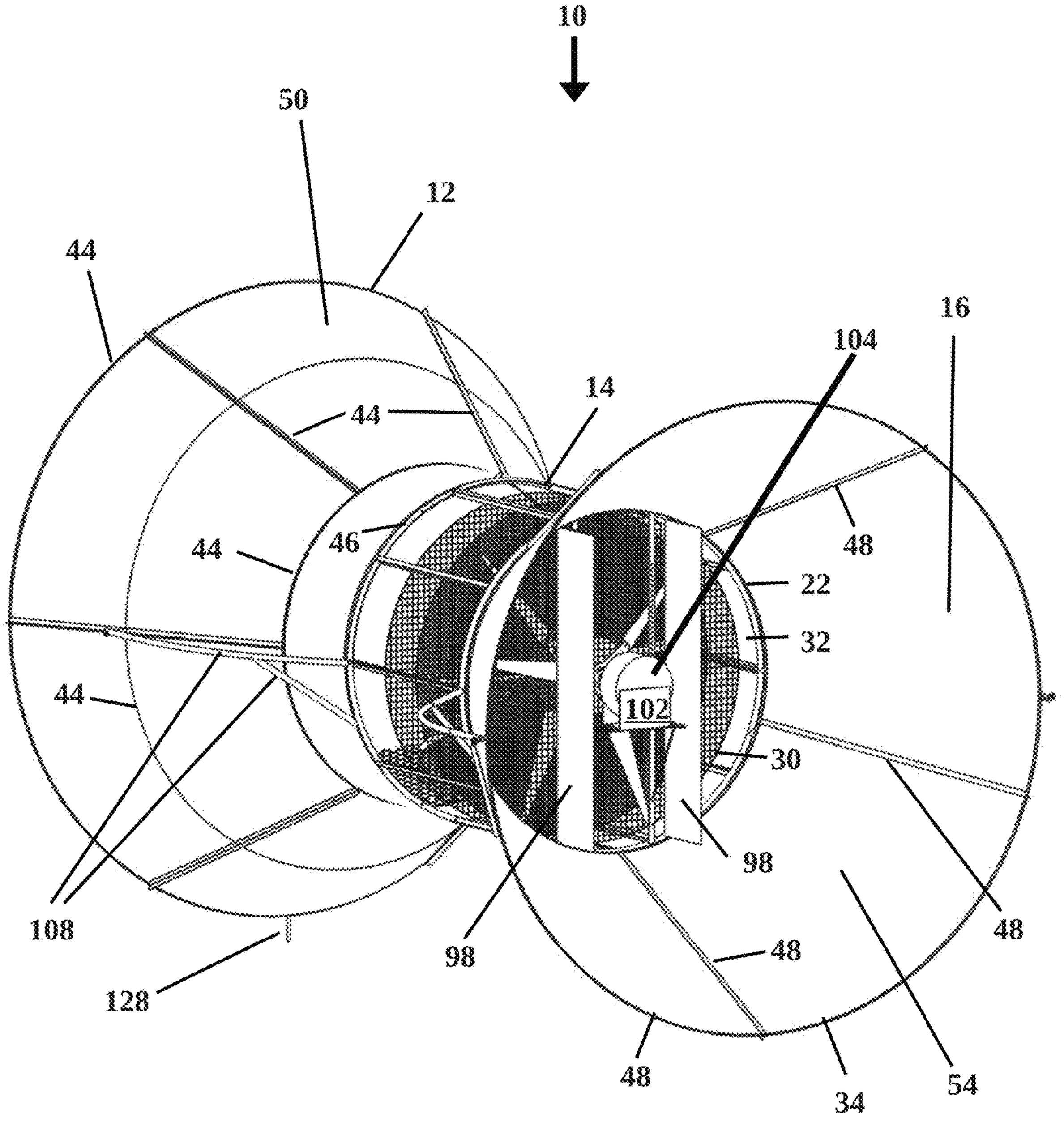
FIG. 8 is a rear perspective view of the power generation apparatus of FIG. 1, and the wind turbine unit is shown without sidewalls for illustration purposes only.

The air foils 98 shown in FIGS. 3 and 6-8 in this example, but not by way of limitation, are a pair of air foils 98, and they are used to further accelerate the wind/airflow 56 entering the wind turbine unit 14 by drawing the wind/airflow through the wind turbine unit 14 at an increased speed/velocity. When wind/airflow moves over the leading edge of the air foil 98 and advances across the air foil 98, the wind on one side of the air foil 98 speeds up and the pressure drops, whereas wind on the opposite side of the air foil 98 is drawn to the low pressure on the opposite side of the air foil 98 and thus accelerates as it it drawn to that area of low pressure. As this cycle occurs, more wind/airflow is drawn to the leading edge of the air foil 98 so the wind/airflow moves through the wind turbine unit 14 at a faster speed compared to if the air foil(s) 98 were not present. The pair of air foils 98 desirably may extend into outlet funnel 16, as illustrated in FIG. 8. The air foils 98 may be movably or fixedly mounted, and may be positioned vertically, horizontally, or at any angle. Any number of air foils 98 may be used, so long as the air foils function as shown and described herein.

The outlet frame ring 60 of the wind turbine unit 14 may also include a support 102 formed to hold at least one generator 104, as illustrated in FIGS. 7 and 8. Desirably, the generator 104 may include at least one gear box (not shown), and the generator 104 may be activated by rotational movement of the turbine blade units 76*a*, 76*b*, 76*c* connected to the central axis shaft 64. The generator 104 may be a permanent magnet generator or an induction generator, or any generator which operates as shown and/or described herein.

Figure 9:
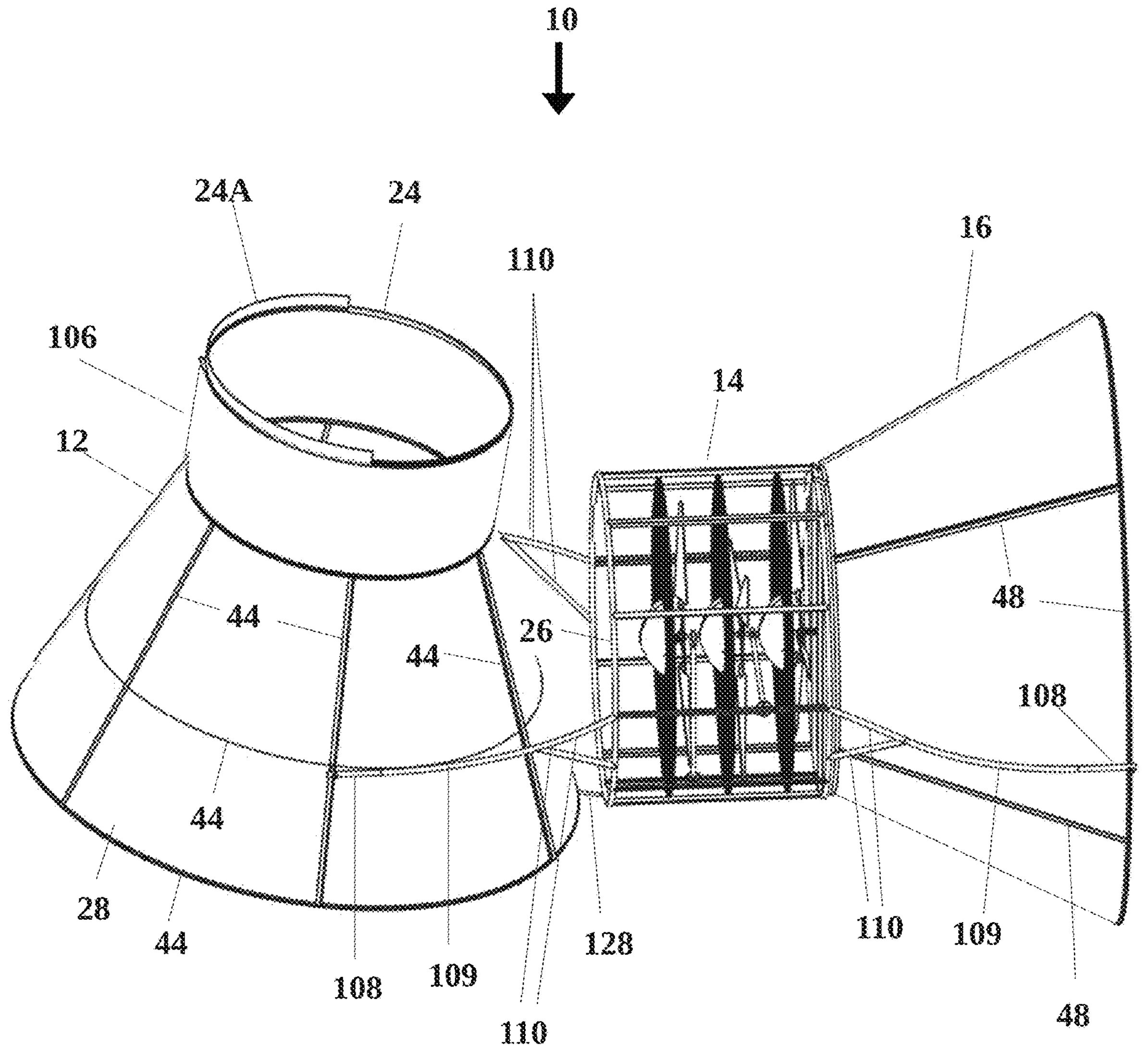
FIG. 9 is a side perspective view of the power generation apparatus of FIG. 1, but showing the pivot of the inlet funnel out of axial alignment, and the wind turbine unit is shown without sidewalls for illustration purposes only.
Figure 10:
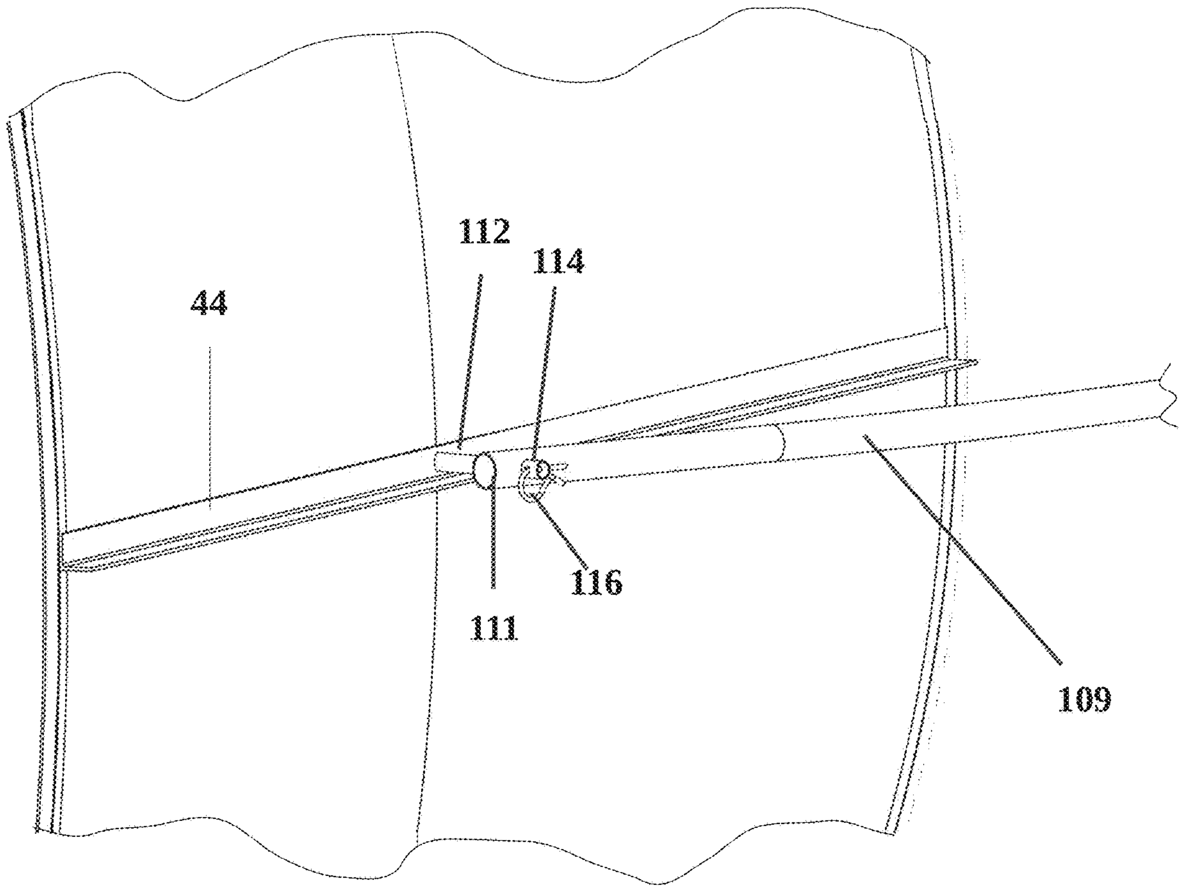
FIG. 10 is a partial view of the pivotal arm of FIG. 9.

The inlet funnel 12 also may include a cylindrical portion 106 positioned next to the entrance 26 of the wind turbine unit 14 and desirably includes a diameter which may be similar or identical to the diameter of the wind turbine unit 14. A pivotal support structure 108 may desirably include a pair of pivotal arms 109. Each pivotal arm 109 may include a "V" shaped end 110 which may connect to the inlet frame ring 58, and/or may also include frame rods 62 and/or support structures 44 of the wind turbine unit 14 and may be spaced 180 degrees apart. An opposite free end 111 of each pivotal arm 109 extends toward the frusto-conical portion of the inlet funnel 12, as shown in FIGS. 8 and 9. As illustrated in FIG. 10, the inlet funnel 12 includes a pair of short support arms 112 positioned 180 degrees apart which extend outwardly a short distance away from the inlet funnel 12.

Alternatively, the support arms 112 may instead extend as a horizontal shaft from one side of the inlet funnel 12, pass through the inlet funnel, and to the opposite end of inlet funnel 12 (not shown). In a further alternative, the support arms 112 may operably connect to a pivot support connected to a horizontal support arm (not shown). The support arms 112 may desirably, but not by way of limitation, be connected to a portion of the support structure 44 of the inlet funnel 12, so that a free end extends therefrom. Each pivot arm 109 desirably includes an aperture 113 therethrough, which is sized to permit the insertion of a free end 114 of a support arm 112 therethrough. Each support arm 112 also may desirably be formed to hold a clip 116, a cotter pin, or similar device known in the art to secure each pivotal arm 109 and each support arm 112 pivotally together. Other pivotal connections and pivotal connection locations may be used, so long as such pivotal connection operate as shown and/or described herein. Special coatings, coverings, such as foam, rubber, silicon, and the like, may be used on one or more of the pivotal support structures 108 to reduce the accumulation of snow and/or ice.

The inlet funnel 12 further includes a sail 120 which is used to control wind/airflow which enters the inlet funnel 12. "Sail" as used herein means a material which permits control of wind/airflow entering the inlet funnel 12 and then into the wind turbine unit 14. The sail 120, like a sail on a boat, is used to move the inlet funnel 12. When increased or high wind speeds occur, which might damage components of the power generation unit 10, the sail "catches" the wind (i.e. the wind/airflow pushes against the sail considerably), which causes the inlet funnel 12 to pivot out of axial alignment and therefore out of its operative position of accelerating wind/airflow and moving wind/airflow through the power generation apparatus 10. However, in this instance, as illustrated in FIG. 9, the inlet funnel 12 pivots a maximum of about 90 degrees, with the wide end 28 downward with respect to its previous position, and in this position, the inlet funnel 12 acts to direct wind/airflow around the wind turbine unit 14 and/or block wind/airflow from entering the wind turbine unit 14, so that it may be less likely that components of the wind turbine unit 14 and the remainder of the power generation apparatus 10 will be damaged when unexpected high gusts of wind/airflow or continuous high wind speeds occur. The speed and amount of wind/airflow pushing against the sail 120 determines how much the inlet funnel 12 pivots at any given time. The inlet funnel 12 may pivot in a range of between about 5 degrees and about 90 degrees. The maximum amount that the inlet funnel 12 may pivot relative to the wind turbine unit 14 desirably is 90 degrees. When the high winds cease, gravity and slower wind speed will permit the inlet funnel 12 to rotate back into its regular position, as shown in FIGS. 1 and 2. "About" as used herein, means plus or minus 10 degrees of the range stated. The importance of the sail 120 is to move the inlet funnel 12 into a position which would be more likely to protect itself, the outlet funnel 16, and especially the wind turbine unit 14 and all components thereof from high damaging winds. The sail 120 which may desirably be positioned across a lower portion 122 of the open entrance 124 of the inlet funnel 12, or over a portion of the entrance 124. The sail 120 desirably permits wind/airflow at a normal speeds therethrough. It will be understood by those having ordinary skill in the art that some degree of calibration of the sail 120 may be needed. For example, a sail 120 made of a mesh with openings therein may permit normal wind/airflow 56 to move through the inlet funnel 12 to produce electricity, but when wind speed approaches damaging levels (such as, for example only, when wind speed approaches 30 mph, which may otherwise be magnified to hurricane wind/airflow speed inside the wind turbine unit 14, then the sail 120 will cause the inlet funnel 12 to rotate to a maximum of about 90 degrees. As the wind/airflow speed increases, the inlet funnel 12 will begin to rotate away from axial alignment with the wind turbine unit 14, and when the wind/airflow speed decreases, the inlet funnel will gradually rotate back into the axial alignment with the wind turbine unit 14. It will be understood that even in a gradual or minimal rotation of the inlet funnel 12, at least some of the wind/airflow will be diverted around or blocked from entering the wind turbine unit 14, and at a full 90-degree rotation, most or all of the wind/airflow will be diverted around and/or blocked from entering the wind turbine unit 14. When the sail 120 is positioned similarly across an upper portion 126 of the entrance 124 to the inlet funnel 12, this position will cause the inlet funnel 12 to rotate about 90 degrees so that the narrow end 24 of the inlet funnel 12 is positioned downward (not shown). The sail 120 may even be positioned outside of the inlet funnel 12 and there may be more than one sail 120. The sail 120 may be formed from a solid material, but more desirably may formed from a mesh, grille, diffuser, and the like. The sail 120 may be formed from metal, plastic, or any material or combination of materials known in the art and commercially available. Alternatively, one or more sensors (not shown) may be used to cause pivoting of the inlet funnel 12. When the sensor(s) is/are activated by a wind/airflow that is deemed excessive, the sensor(s) may activate an electric motor (not shown) which may desirably be operatively connected to the inlet funnel via connectors (not shown) or other means (such connectors and means are known in the art and commercially available) to move the inlet funnel 12 in a range of between 5 degrees and a maximum of 90 degrees out of axial alignment with respect to the wind turbine unit 14. When the sensor(s) cease such activation, or it/they is/are activated in an alternative manner, the connectors and the electric motor desirably may cooperate to return the inlet funnel 12 into the axial alignment with the wind turbine unit 14 (not shown).

A stop 128, formed by, for example, but not by way of limitation, a short rod, also extends outwardly and downwardly from the inlet funnel 12, as shown in FIG. 9, to prevent over-rotation of the inlet funnel 12 in one direction, and the stop 128 would instead be positioned on 180 degree opposite end of the wide end 28 of the inlet funnel 12 if the inlet funnel 12 were instead configured to rotate in the opposite direction (not shown). Additionally, rubber, felt, foam, wood, or any other commercially available products, and the like, may form a part or all of a stop 128 to cushion the stop 128 when it makes contact. It will be understood that there are other ways and components in the art to limit or stop rotation other than the one illustrated in this non-limiting example. It will be appreciated that additional stops (not shown) may be used as well to limit rotation of the inlet funnel 12.

A pivotal support structure 108 may be provided between the outlet funnel 16 and the wind turbine unit 14. The outlet frame ring 60 of the wind turbine unit 14 may also include a pivotal support structure 108. A pair of pivotal arms 109 are connected at the "V" ends 110 thereof to the outlet frame ring 60 and include free ends 111 which extend to the outlet funnel 16 in the same manner previously described for the inlet funnel 12 and the wind turbine unit 14. An aperture 113 is formed in the free end 111 of each pivotal arm 109. A pair of support arms 112 are positioned on a portion of the outlet funnel 16 and include a free end 114 configured to extend into the aperture 113 of the free end 111 of the pivotal arms 109. Each support arm 112 is configured to via the aperture 113 sized to accept a free end 114 of a support arm therethrough, and the free end 114 is formed to hold a clip therein to secure the pivotal arm 109 described above for the inlet funnel 12, so that the outlet funnel 16 may or may be permitted to rotate, and may include one or more stops (not shown). Alternatively, the outlet funnel 16 may be connected to the wind turbine unit 14 and be held in a fixed position, using, for example only, the pair of pivotal arms 109 with "V" ends 110 (as described and illustrated previously for the inlet funnel 12), or by one arm, or by using, for example only, bolts, screws, welds, and the like (not shown).

Figure 12:
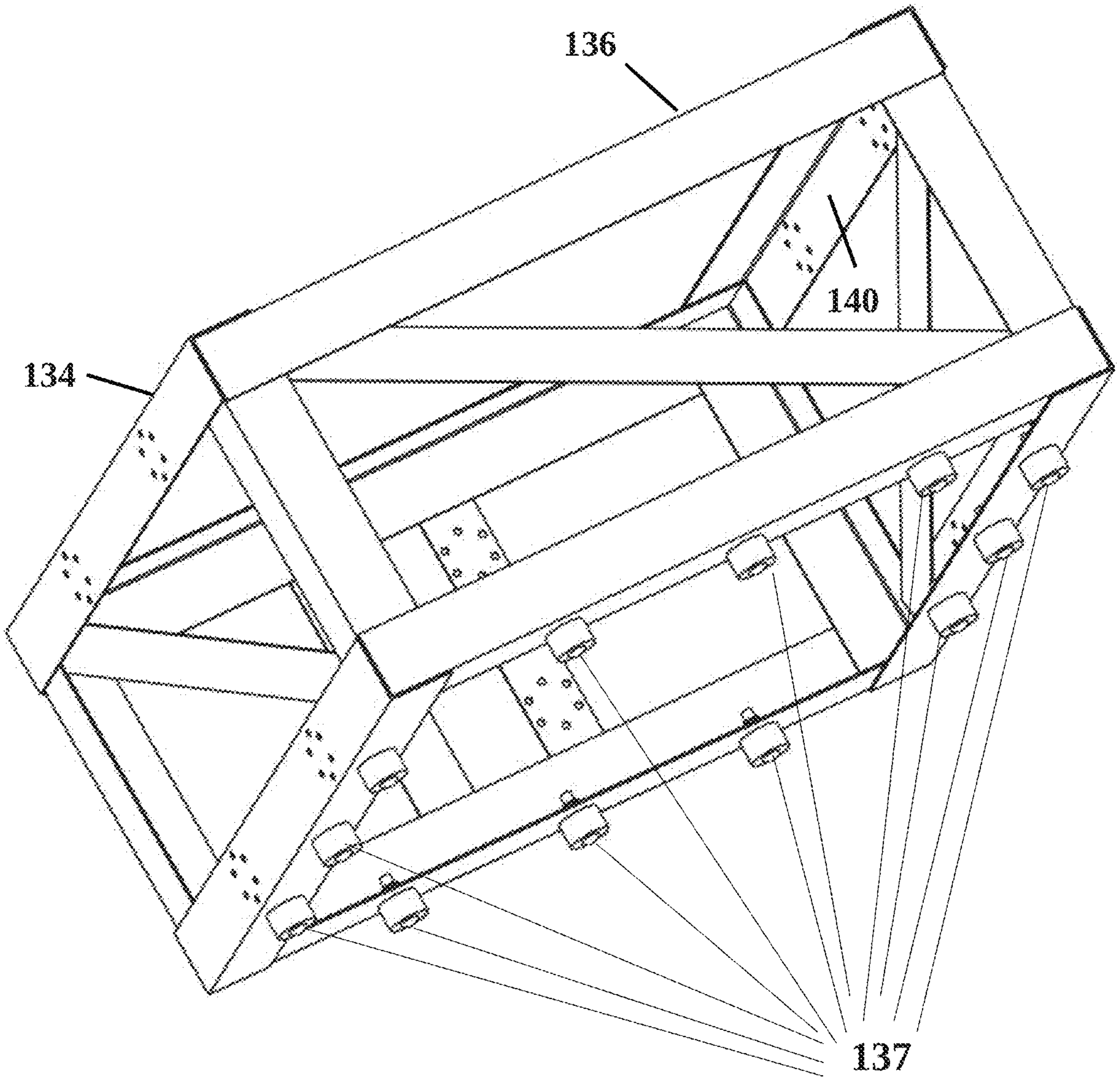
Figure 13:
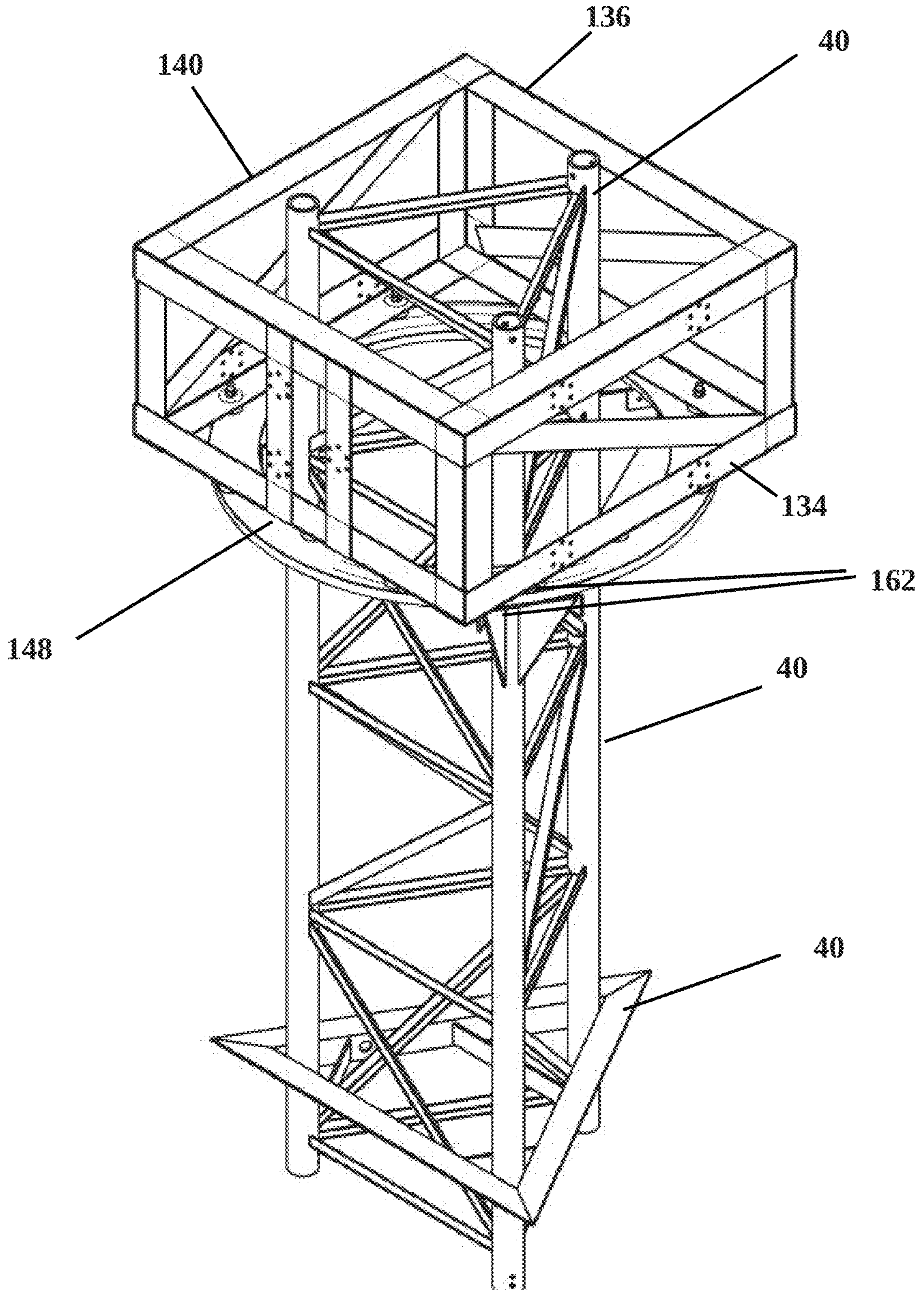
FIG. 13 is a perspective view of the hub of FIG. 12 carried by a bearing plate which is carried by a tower.
Figure 14:
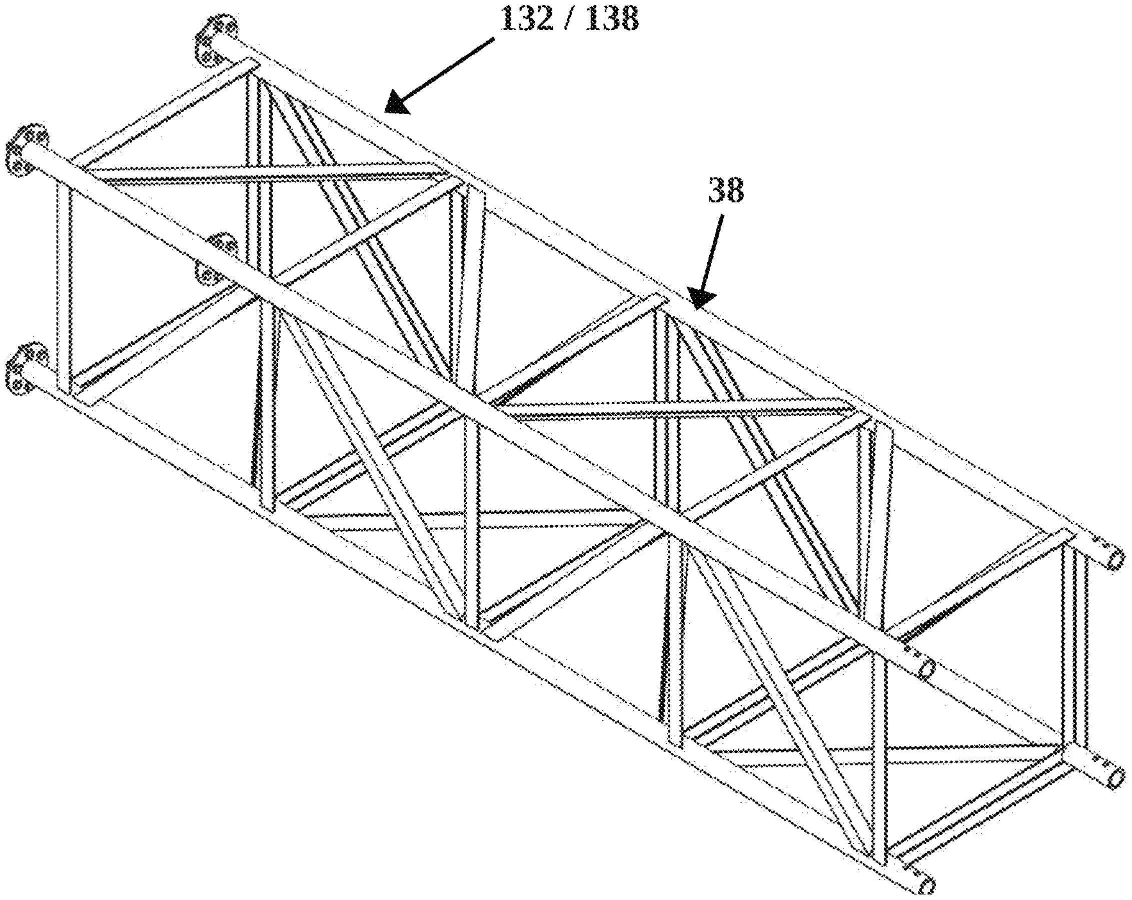
FIG. 14 is a perspective view of a portion of a horizontal support arm(s) which is connectable to the hub shown in FIGS. 12 and 13.
Figure 15:
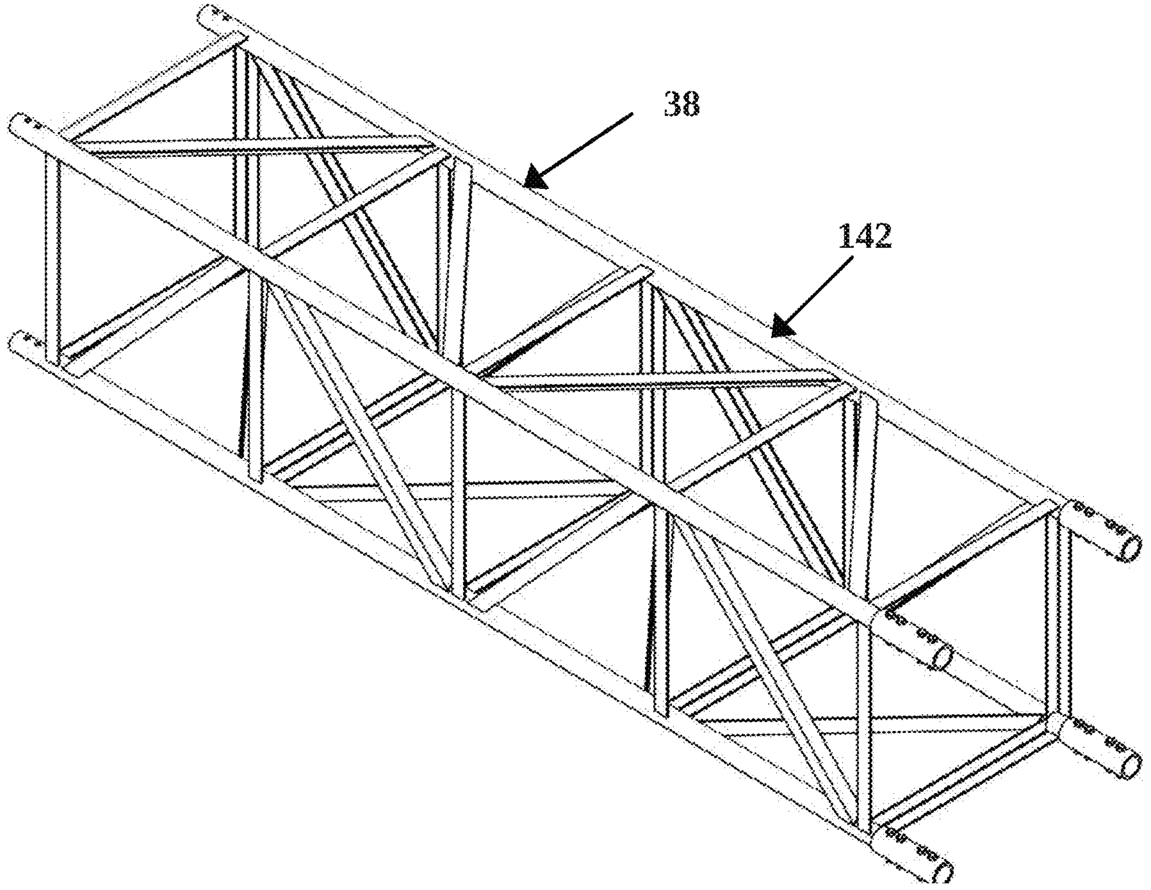
FIG. 15 is a perspective view of a modular portion which is connectable to the portion of the horizontal support arm(s) illustrated in FIGS. 11 and 14 to further extend horizontal support arms.

Referring to FIGS. 11-16, each power generation apparatus 10 may be carried by the horizontal support arm 38 which may extend transversally relative to the vertical tower 40. At least a first portion 132 of the horizontal support arm 38 may be connected to one side 134 of a support hub 136, and a second portion 138 of the horizontal support arm 38 may be connected to an opposite side 140 of the support hub 136. Further, one or more additional portions 142 of the horizontal support arm 38 may be connected to the free end 144 of each first and second portions 132, 138 of the horizontal support arm 38, as illustrated in FIGS. 11, 14, and 15 as modular arm units, or may be bolted or welded thereto, by any means known in the art. Alternatively, the horizontal arm 38 along with each first and second portions 132, 138 and the support hub 136 may be formed as a continuous horizontal support arm 38. It will be understood that the horizontal support arm 38, first and second portions 132, 138 thereof, as well as the support hub 136 may be bolted or welded together, or connected together permanently or removably, via any manner known in the art and by commercially available components, products, and the like.

The horizontal support arm 38 may be an open square with supports and struts, or alternatively, it could be triangular, and any shape or combination of shapes may be used, so long as the horizontal support arm 38 functions as shown and/or described herein. Desirably, power generation apparatus 10 may be positioned both above the horizontal support arm 38 and below the horizontal support arm 38 as shown in FIG. 11. Different configurations of one or more horizontal support arms 38 may be possible, and any position of the horizontal support arm(s) may be used, so long as the power generation apparatus 10 and the power generation system 42 functions as shown and/or described herein. Further, the horizontal support arm 38 or individual or groups of power generation apparatus 10 may be positioned at an angle on the horizontal support arm 38 as well (not shown).

Figure 16:
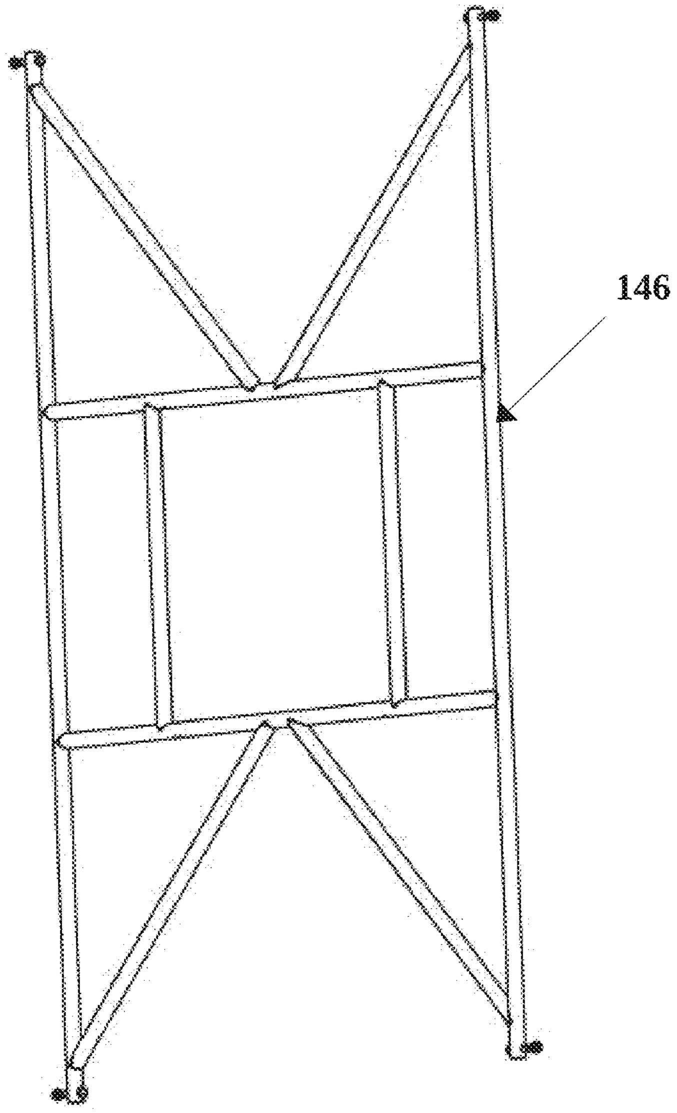
FIG. 16 is a top plan view of a connector used to connect at least a portion of each power generation apparatus to one of the horizontal support arm(s)
Figure 21:
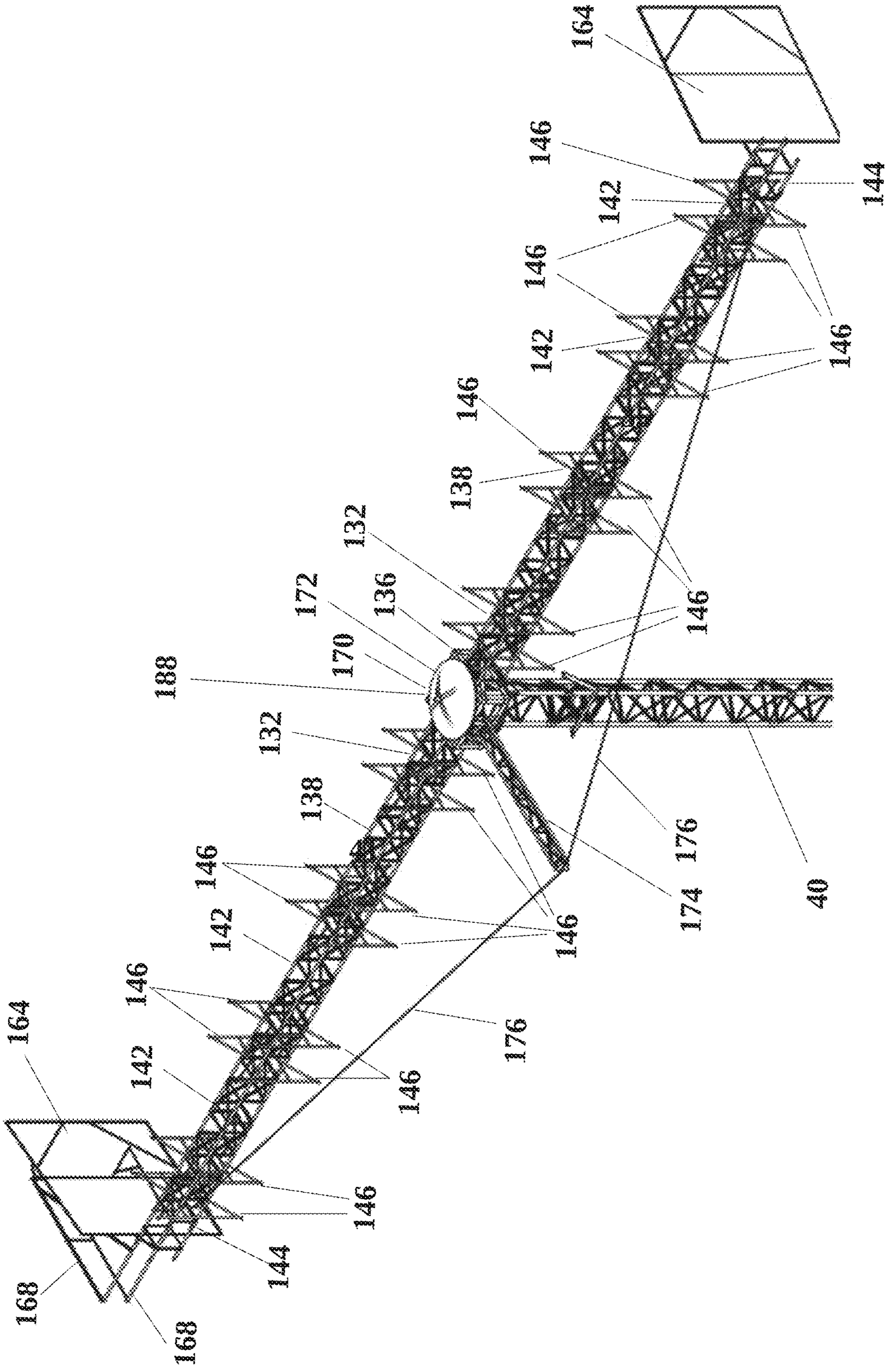
FIG. 21 is a perspective view of a plurality of portions of horizontal support arms connected together to form an elongated support arm, and showing a rudder positioned on each end of the horizontal support arm.
Figure 22:
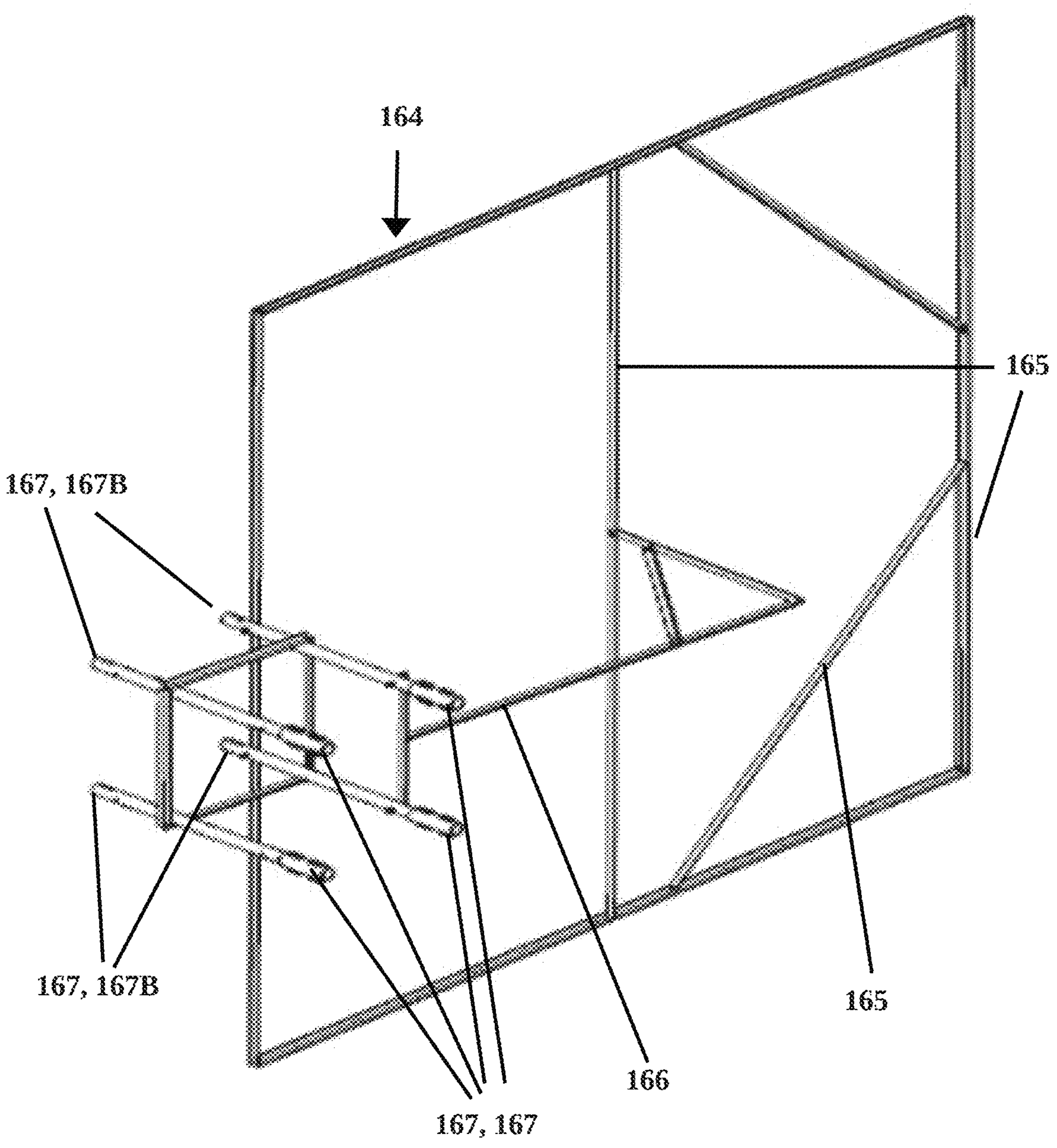
FIG. 22 is a perspective view of one side of a rudder including an interface that connects to both an end of a horizontal support arm and to a landing gear.
Figure 23:
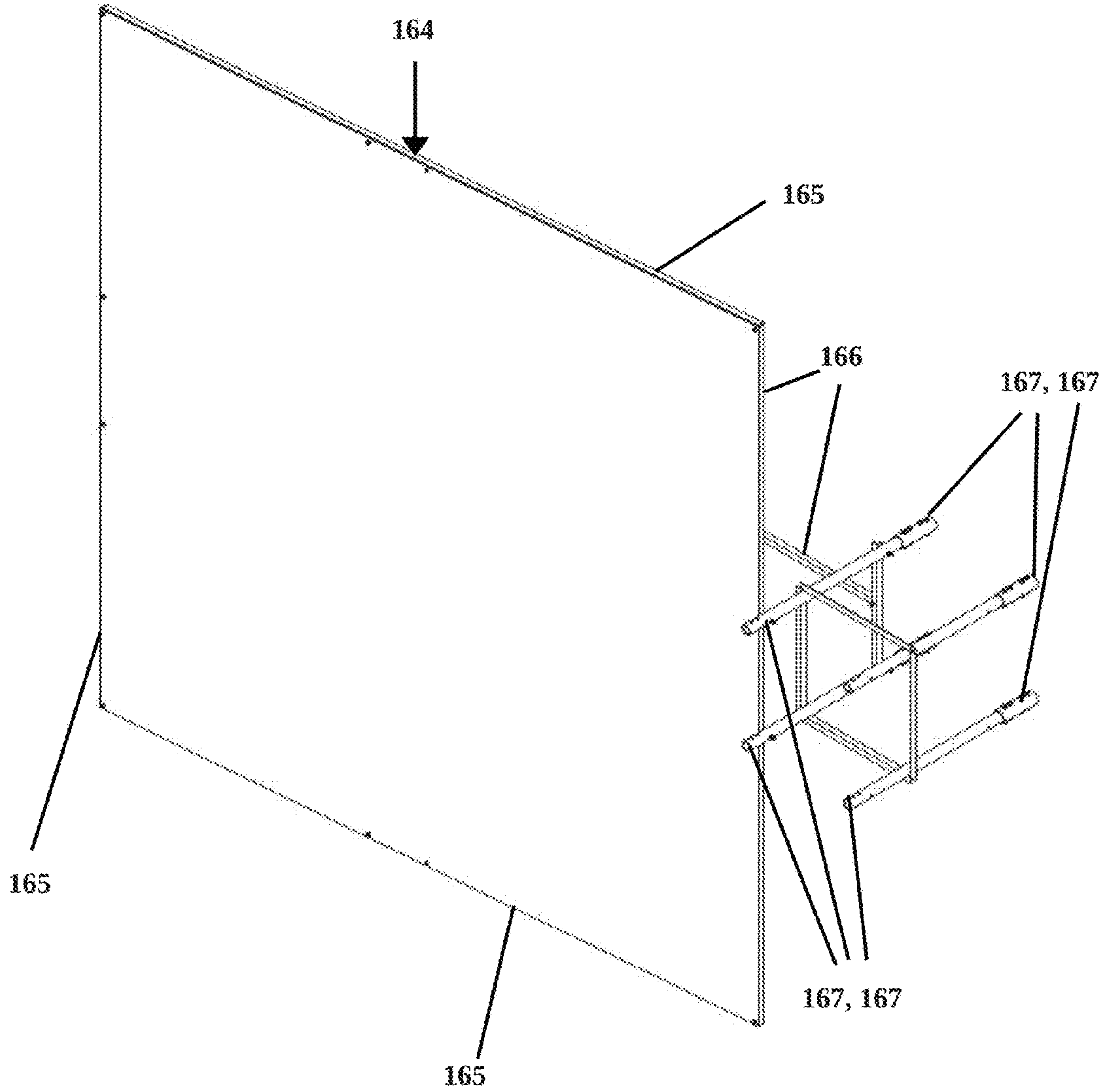
FIG. 23 is a perspective view of the opposite side of the rudder and an interface that connects to both an end of a horizontal support arm and to the landing gear of FIG. 22.
Figure 24:
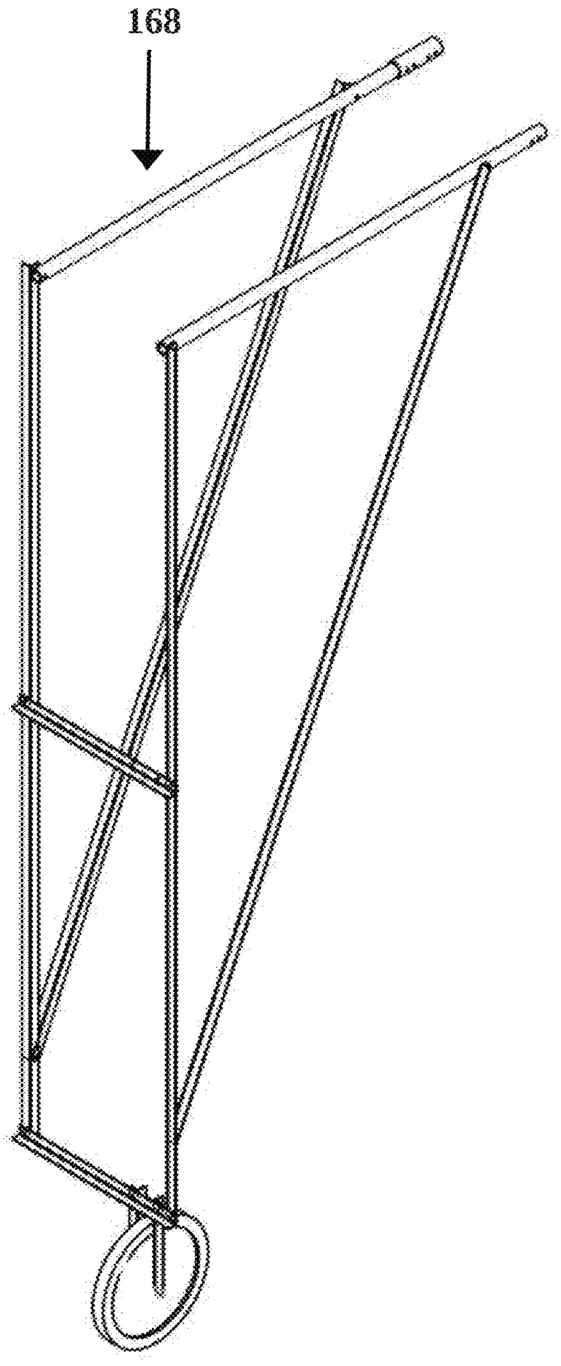
FIG. 24 is a perspective view of the landing gear having a wheel which is connectable to the interface of FIGS. 22 and 23.

Each power generation apparatus 10 may be carried by one or more horizontal support arm(s) 38 via one or more connectors 142. Connectors 142 as shown in FIGS. 16 and 21 may be used to connect at least a portion generator apparatus 10 and desirably, the wind turbine unit 14, to the horizontal support arm 38. Alternatively, shafts, rods, C or U-shaped connectors, or any connector(s) known in the art may be used to connect any portion of the power generation apparatus 10 to the horizontal support arm 38.

Figure 17:
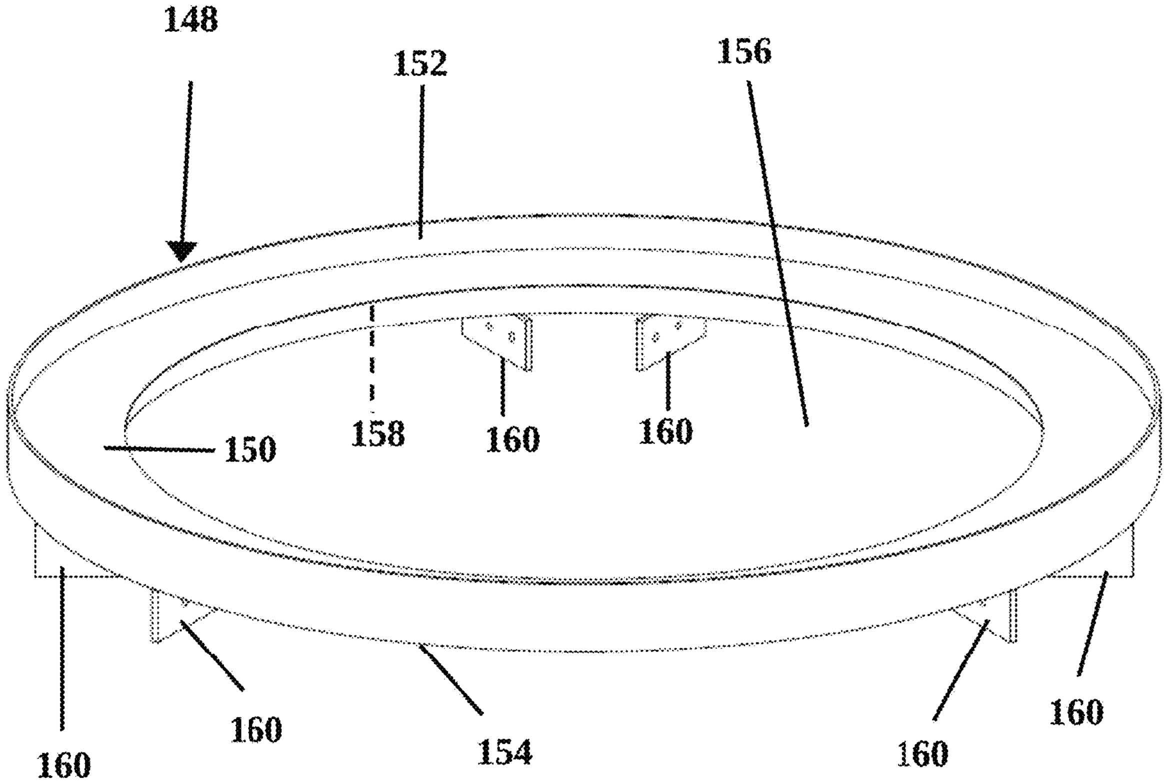
FIG. 17 is a perspective view of the bearing plate illustrated in FIG. 13.
Figure 18:
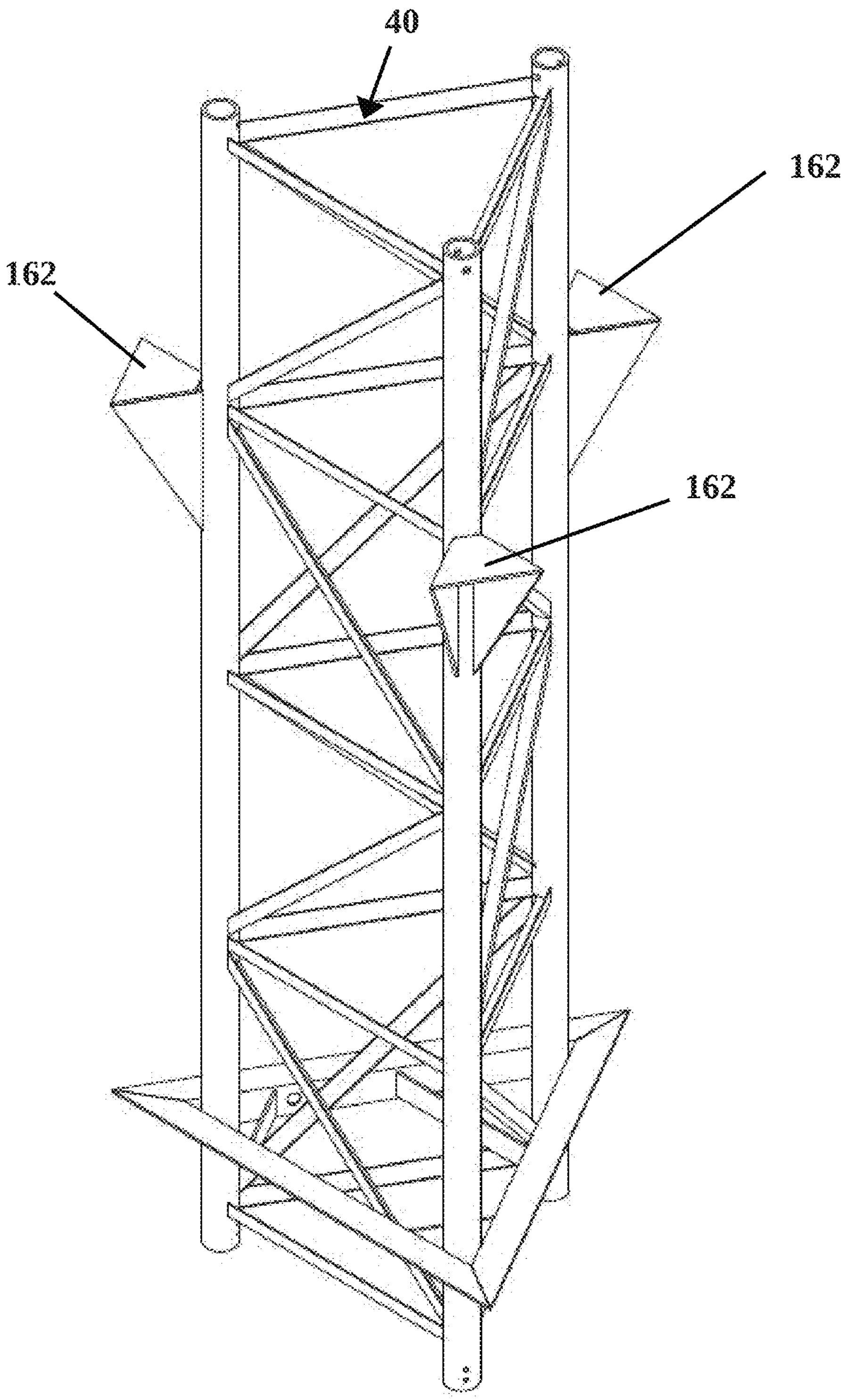
FIG. 18 is a perspective view of a portion of the tower, showing the bearing plate support arms as shown in FIG. 13.
Figure 19:
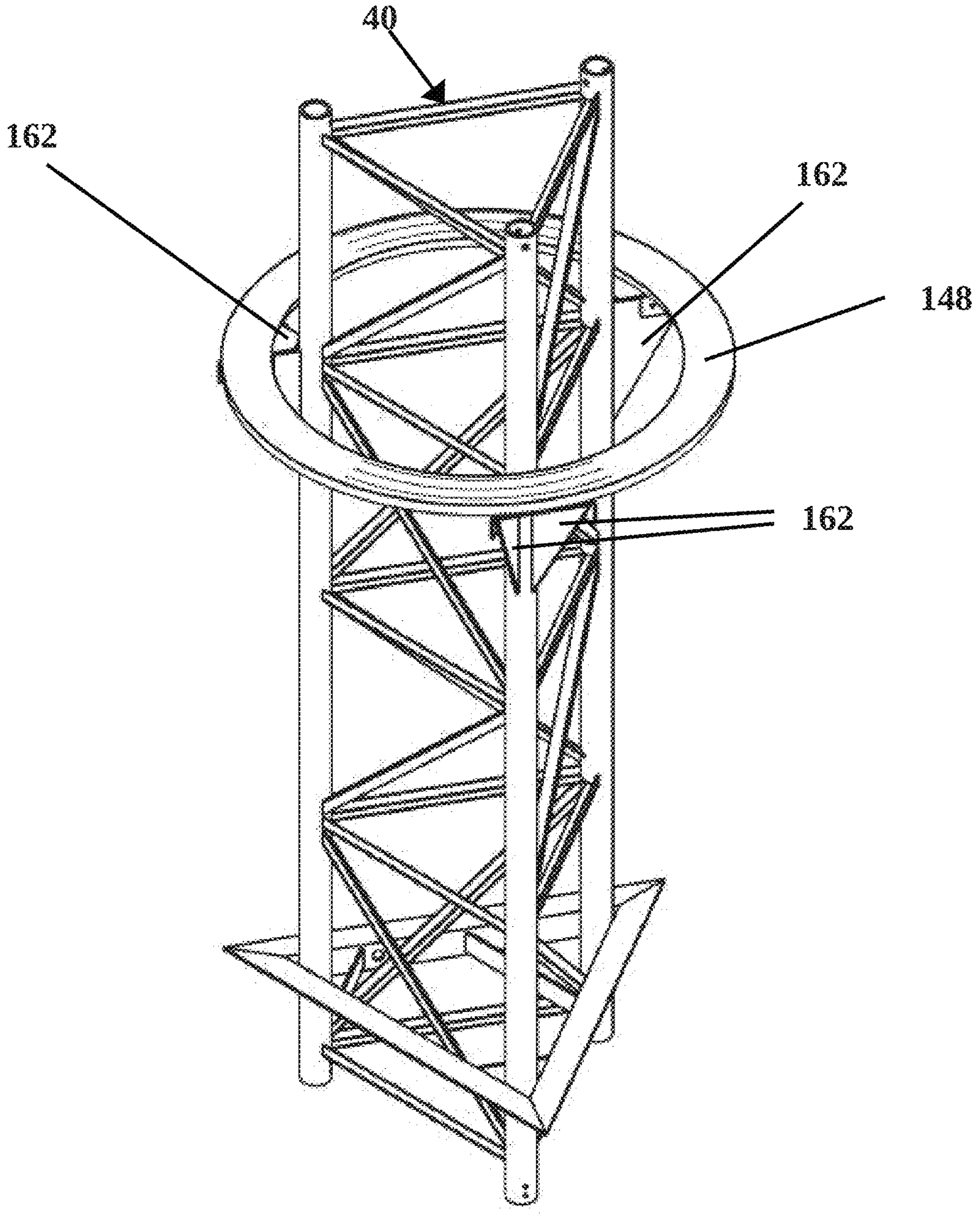
FIG. 19 is a perspective view of the bearing plate supported by the bearing plate support arms of the tower illustrated in FIG. 18.
Figure 20:
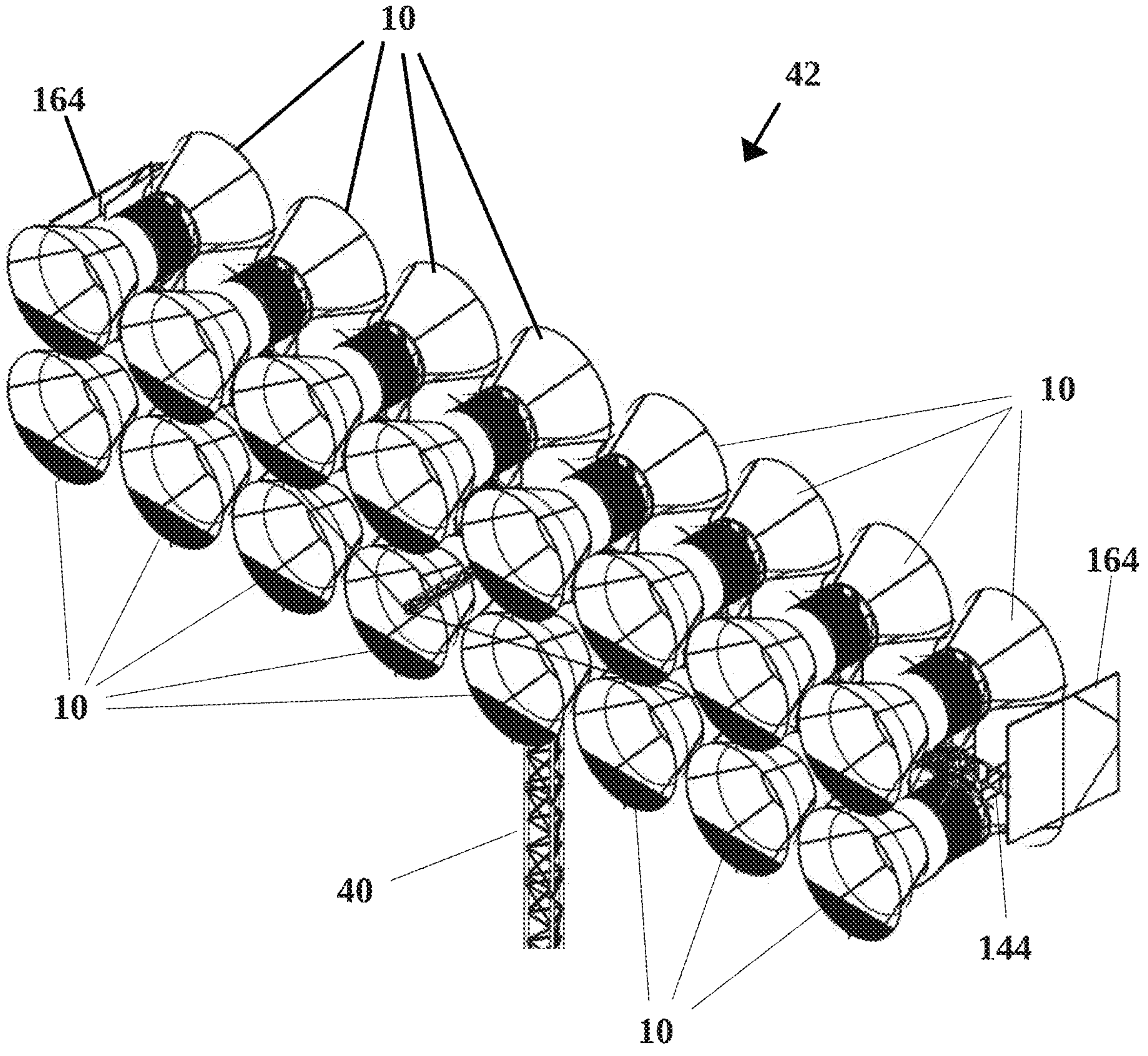
FIG. 20 is a perspective view of a plurality of power generation units carried by a horizontal support arm with eight power generating units positioned above the horizontal support arm and eight power generating units positioned below the horizontal support arm (each wind turbine unit shown without sidewalls for illustrative purposes only) which is carried by a tower.

The support hub 136, as shown in FIGS. 12 and 13, may be a square or triangular in cross-section, or any shape or combination of shapes, so long as the support hub 136 operates as shown and/or described herein. The support hub 136 may be made from a metal or any material/metal(s) or combination(s) thereof known in the art which functions as illustrated and/or described herein. The support hub 136, as illustrated in FIGS. 12 and 13 may be carried via a plurality of rollers 137 (or other components known in the art and commercially available) connected thereto. The support hub 136 is positioned such that the plurality of rollers 137 thereon contact a bearing plate 148 (FIGS. 13, 17, and 19), which is formed to permit the support hub 136 to rotate on/about/around the bearing plate 148 thereby permitting rotation of the horizontal support arm 38 around the tower 40.

The bearing plate 148 may, in one non-limiting example, be round. The bearing plate 148 may include a planar surface 150 and a raised lip 152 positioned along an outer edge 154 of the bearing plate 148. An opening 156 may be formed in the planar surface 150 of the bearing plate 148 so that a portion of the tower 40 may extend through the bearing plate 148 and the support hub 136. On a lower surface 158 of the bearing plate 148, one or more holders 160 extend from the lower surface 158 to cooperate with one or more tower supports 162 to hold the bearing plate 148 in a fixed but releasable position relative to the tower 40. The support hub 136 and its horizontal support arm 38 may rotate on the bearing plate 148 around the tower 40. The tower 40 may desirably include additional tower supports 162 for carrying one or more additional bearing plates 148. Alternative support hubs and/or bearing plates may be used, so long as each operates as shown and/or described herein. Stops (not shown) may be added to the bearing plate 148 or support hub 136 to limit the degree of rotation about the tower 40.

The one or more horizontal support arms 38 may desirably carry one or more rudder(s) at each respective free end thereof, as illustrated in FIGS. 20-23. The pair of rudders 164 are used to orient the horizontal support arm 38 so that the inlet funnel 12 of each wind turbine unit 14 may be moved into the direction of the oncoming wind/air flow. While the pair of rudders 164 are presently each shown as a flat square plate, any shape or combination of shapes may be used. Each rudder 164 may be constructed from metal, plastic, or any material(s) known in the art, so long as the rudder(s) operate as shown and/or described herein. Alternatively, a motor (not shown) may be connected to the horizontal support arm 38 to move the horizontal support arm 38 into the desired orientation. In this alternative, it will be understood that the rudders 164 may not be necessary.

One or more rudders 164 may include rudder support structures 165. One or more rudders 164 may be connected to a horizontal support arm 38 via a rudder interface 166. A landing gear interface 167 may desirably connect the rudder interface 166 to a landing gear 167, and the landing gear 167 may carry a wheel 168. The landing gear 168 may be easily connected and disconnected from the landing gear interface 167, so that the landing gear 168 may be used with the lowering of any number of towers 40 in different locations. Should the tower 40 be lowered via hinges on the tower 40 (not shown) to allow for repair and maintenance of any portion of the power generation system, one far end of the horizontal support arm 38 will likely descend toward ground or surface first via the additional weight of the landing gear 168 to absorb the impact and permit further control of lowering the various structures of the power generation apparatus 10. The landing gear 168 is designed to protect the horizontal support arm 38 and the one or more power generator apparatus 10 carried thereon from contact with the ground or a surface which supports the at least a portion of the tower 40 is lowered toward the ground or support surface.

The tower 40 may include a convex cap 170 positioned over at least a portion of the top 172 of the tower 40. The convex cap 170 may desirably be connected to the tower 40, and the convex cap 170 may be used at least to limit rainwater, snow, ice, and the like from flowing into or down the tower 40 and onto the bearing plate 148, and to protect the support hub 136 and its associated connected horizontal support arm(s) 38 from being moved or lifted upward and/or off of the tower 40 during strong winds or when the tower 40 is lowered for maintenance. An additional tower arm 174 may extend outward from the tower 40 and desirably positioned to be facing into the wind/airflow by one or more guy wires 176. The guy wires 176 may connect to any portion of the first and second portions 132, 138 of the horizontal support arm 38, as shown in FIG. 21. These one or more guy wires 176 together with the additional tower arm 174 prevent the horizontal support arm 38 from breaking/bending in high winds. In a similar manner, an additional vertical tower arm (not shown) may extend above the top of tower 40, and one or more guy wires may connect from one section of the horizontal support arm 38, across the additional vertical tower arm (not shown) and to an opposite section of the horizontal support arm 38, in order to support the horizontal support arm 38 and prevent it from breaking down under the weight of power generating apparatuses 10 installed on the horizontal support arm 38. Other cables, guy wires, and the like may be connected to the tower and/or the horizontal support arm as well (not shown).

The tower 40 may be constructed in a manner similar to the horizontal support arm 38, but instead of a plurality of square truss structures, the tower 40 may be desirably constructed, but not by way of limitation, as a triangular truss structure. Of course, the tower 40 may be, for example only, any shape and/or size, and with or without a wide base structure. The tower may be formed to be telescoping, to permit the tower to be raised and lowered. The tower may be formed from a pole, a tube, or a rod structure, with or without openings therethrough (not shown). Any material and/or metal(s) known in the art which functions as a tower as illustrated and/or described herein may be used.

FIG. 11 illustrates one tower 40. Such towers 40 may be about 30 feet in height, if the tower 40 is built in an area where lower elevation is sufficient to capture sufficient wind/air flow for the power generating apparatus 10. Alternatively, a tower 40 may be 60, 80, 100, 120, 140 feet in height, and the like, to capture sufficient wind/air flow for the power generating apparatus 10, or to support two or more horizontal support arms 38 and accompanying power generating apparatus 10. Alternatively, if a tower is mounted on a roof of a high-rise building, or structure, on a top of a hill, on the side of a mountain, and the like, it will be appreciated that the height of the tower 40 may be shorter relative to a tower not installed on top of an elevated natural or man-made structure. Those having ordinary skill in the art are familiar with such requirements.

The tower 40 may include hinges or other mechanisms, as previously described, which permits at least a portion of the tower 40 and therefore the one or more horizontal support arms(s) 38 thereon to be lowered to a surface or the ground. In one alternative, the tower 40 may include one or more hinges which permit the tower to be lowered to the ground or surface (not shown). It will be appreciated that the one or more hinges desirably permit at least a portion of the tower 40 to tilt and move downward as well as to be moved upward again. The tower 40 would be moved downward to permit installation and/or maintenance, and the tower 40 would be capable of being returned to its functional vertical position. The footings of the tower 40 may be concrete but may also include other materials and/or components which are known in the art and that operate to secure the tower 40 to the ground or a surface. Guy wires, cables, or other structures may be connected to the tower to assist in raising and lowering the tower 40. Alternatively, the tower 40 may include components which permit the horizontal support arm 38 to be raised and lowered for installation and maintenance as well (not shown).

The power generation apparatus 10 desirably uses commercially available electrical parts, generators, generator technology, and other known electrical technology to generate alternating current ("AC") and/or direct current ("DC").

Electricity (AC or DC) is desirably produced by each generator 104 of each wind turbine unit 14 once activated by an appropriate wind/air flow 56, and it may be transferred via one or more conductors 178. DC could easily be converted to AC at almost any point along the way, via one or more inverters 180, before it is sent long distances in order to minimize power losses. However, if the power generated is AC, this power can be 3 (three) phase power, single phase power, or any number of phases. This type of AC may need to be filtered with an AC filter before it is suitable to be used by the electric grid or electrical devices.

If there is more than one phase of AC, the multiple phases can be consolidated together via controller hardware and or software. Alternatively, if there is more than one phase of AC, the multiple phases can be consolidated together by first converting the phases to DC via a rectifier or other AC to DC converter.

Electrical current from each generator 104 is ultimately transmitted via conductors 178 through one or more slip rings 188. Each slip ring 188 is configured so that a first portion 190 of the slip ring 188 may rotate up to 360 degrees (or the degrees permitted by the horizontal support arm(s) and any stop(s) which may limit rotation). The second portion 192 of the slip ring 188 is fixed and stationary, and output conductors 194 carry the current to additional locations for use. The slip ring 188 may be installed at the top of the tower 172, or around the outside of the tower 40 (not shown). In the present example, a single slip ring 188 may desirably be located at the top of the tower 172 and is associated with the horizontal support arm 38. An additional slip ring 188 can be configured to surround a section of the body of the tower 40 (not shown) to support the generators installed and rotating with on additional horizontal support arms 38 (not shown). One slip ring 188 is installed per horizontal support arm 38. In fact, installing multiple slip rings 188 per horizontal support arm 38 do not function well because in this example, the conductors 178 connected to the first portion 190 of the slip ring 188 of two or more slip rings 188 will become tangled (cross over each other) as the one horizontal arm 38 rotates around the tower 40. This occurs because these conductors 178 are not all rotating on the same axis, because each additional slip ring has its own axis. Therefore, as noted above, it may be desirable and/or it may be required for proper operation that the conductors 178 that extend from each generator 104 are at least operably connected to a single slip ring 188 per each horizontal support arm 38.

The one or more conductors that transmit electric current from the top of the tower 40, down toward the earth may pass through one or more conduit (not shown). Additionally, the one or more conductors located inside or outside the conduit, may or may not be covered in insulation.

The one or more conductors that transmit electric current from the lower end of a tower 40 to end users may be elevated on poles or may be buried underground, or both. In either or both cases, those conductors may or may not be insulated. Additionally, each conductor may pass through one or more conduits.

Power meters may be installed or affixed to various locations of the electrical system to measure power produced by each generator, or power lost during transmission and/or conversion, as well as to determine power used by end users and/or power depleted. Of course, such meters may transmit the foregoing information as well as additional information via any means or combination of means known in the art.

Conductors in the electrical system may be wired in series when volts need to be increased, or wired in parallel when the Current/Amps need to be increased.

It will be understood that when DC needs to be converted to AC, inverters may be used, and when AC needs to be stepped up or stepped down, transformers may be used. When AC needs to be converted to DC, rectifiers or other AC to DC converters may be used. When DC needs to be stepped up or stepped down, DC boosters, or DC bucks, or DC-DC buck boosters may be used.

Further, when voltage spikes need to be smooth out, capacitors or other power storage devices may be used. When power needs to be stored, batteries, capacitors, or other power storage units, as well as charge controllers may be used.

In addition, each conductor carrying power from each generator may be operatively linked to one sole inverter, or alternatively, the conductor from each generator may be linked into individual inverters, or a combination of both may be used.

A dump load may be directly or operatively linked to one or more generators. The dump load may desirably be configured to prevent the one or more generator(s) from over-spinning and otherwise being damaged; Such over-spinning may occur during high wind speeds, when the power grid is down, when storage batteries are full, and the like.

Turning to FIGS. 25-29, examples are provided of various block diagrams which illustrate a few possible adaptation and uses of the current generated by the power generation apparatus 10. It will be appreciated that FIGS. 25-27, and 29 may show more of an industrial or commercial use, while FIG. 28 may illustrate a single home use of the power generation apparatus 10.

Figure 25:
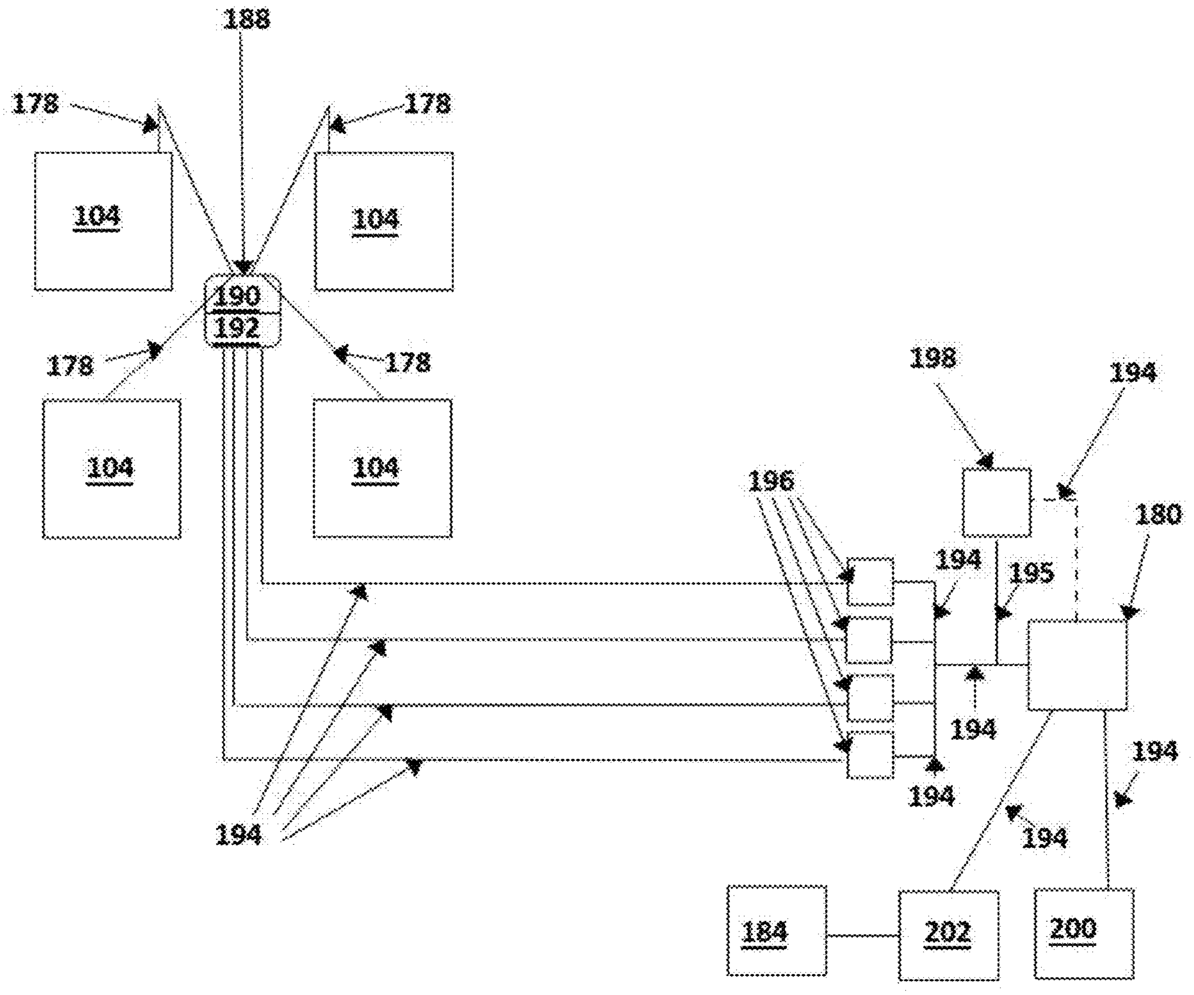
FIG. 25 is a block diagram of a configuration of electrical power produced by four generators of the power generation apparatus and transmitted for use.

FIG. 25 illustrates four generators 104, with one conductor 178 connected to each generator 104. Each conductor 178 extends to the first portion 190 of the slip ring 188. Four conductors 194 extend from the second portion 192 of the slip ring 188 and each conductor 194 connects to one of the four AC-DC converters 196. The current from the four AC-DC converters 196 is combined into one current carried by one conductor 194 which sends the current via a branching conductor 195 to power storage 198 and the inverter 180 (with or without a controller), both of which may be inter-connected. From the inverter 180, the current is carried via conductor 194 to an end user 200, and to a transformer 202. Power may also be carried from the transformer 202 to the electric grid 184.

Figure 26:
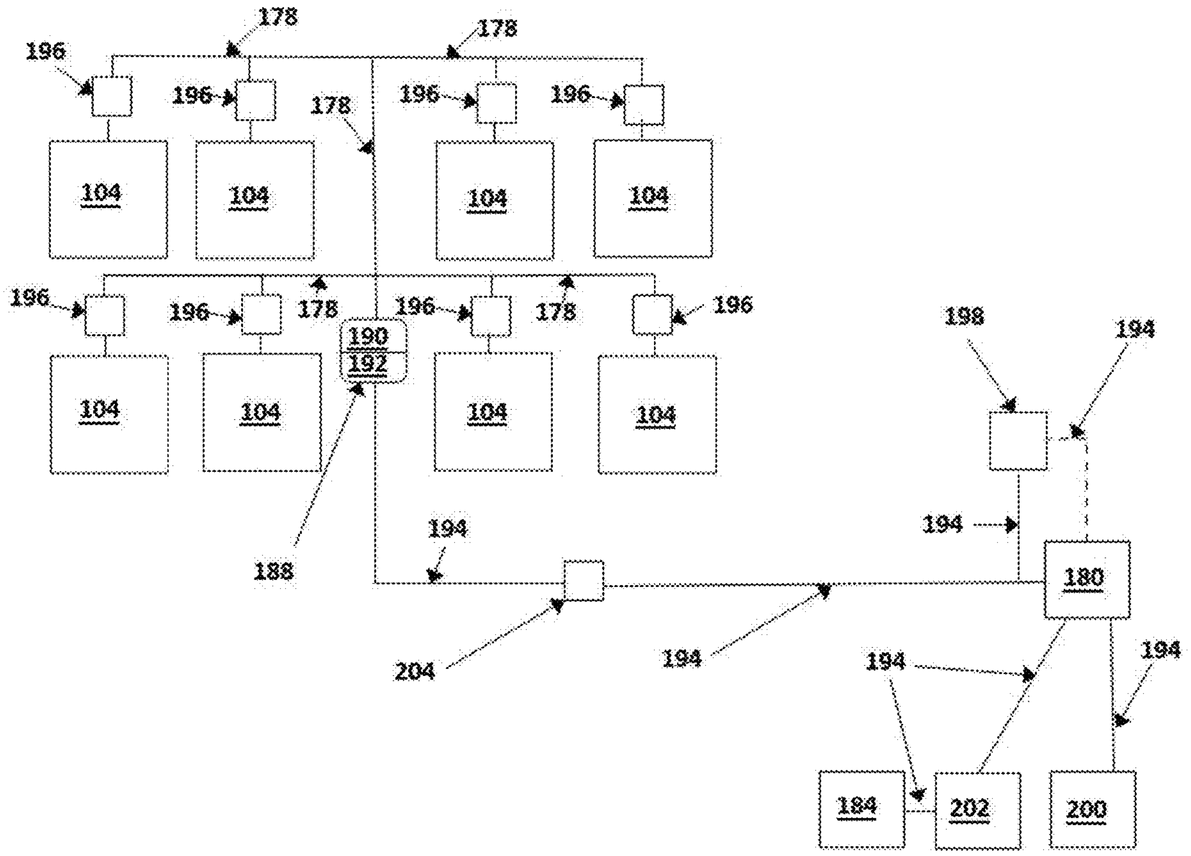
FIG. 26 is a block diagram of another configuration of electrical power produced by eight generators of the power supply apparatus and transmitted for use.

FIG. 26 illustrates one upper set and one lower set of four generators 104 per set (i.e., eight generators 104). Each generator 104 of both sets is connected directly to an AC-DC converter 196 via a conductor 178. The conductor 178 connected to each AC-DC converter 196 connects to the conductor 178 of the upper set and another conductor 178 may connect to the lower set, with both conductors 178 converging together to provide one conductor 178 to the first portion 190 of the slip ring 188. One conductor 194 extends from the second portion 192 of the slip ring 188 and the conductor 194 connects to a DC-DC buck booster 204. The conductor 194 extends from the DC-DC buck booster 204 to both power storage 198 and an inverter 180 (with or without a charge controller) which are connected together. The inverter 180 connects via conductors 194 to an end user 200 and to a transformer 202, and the transformer 202 is also connected by a conductor 194 to the electric grid 184.

Figure 27:
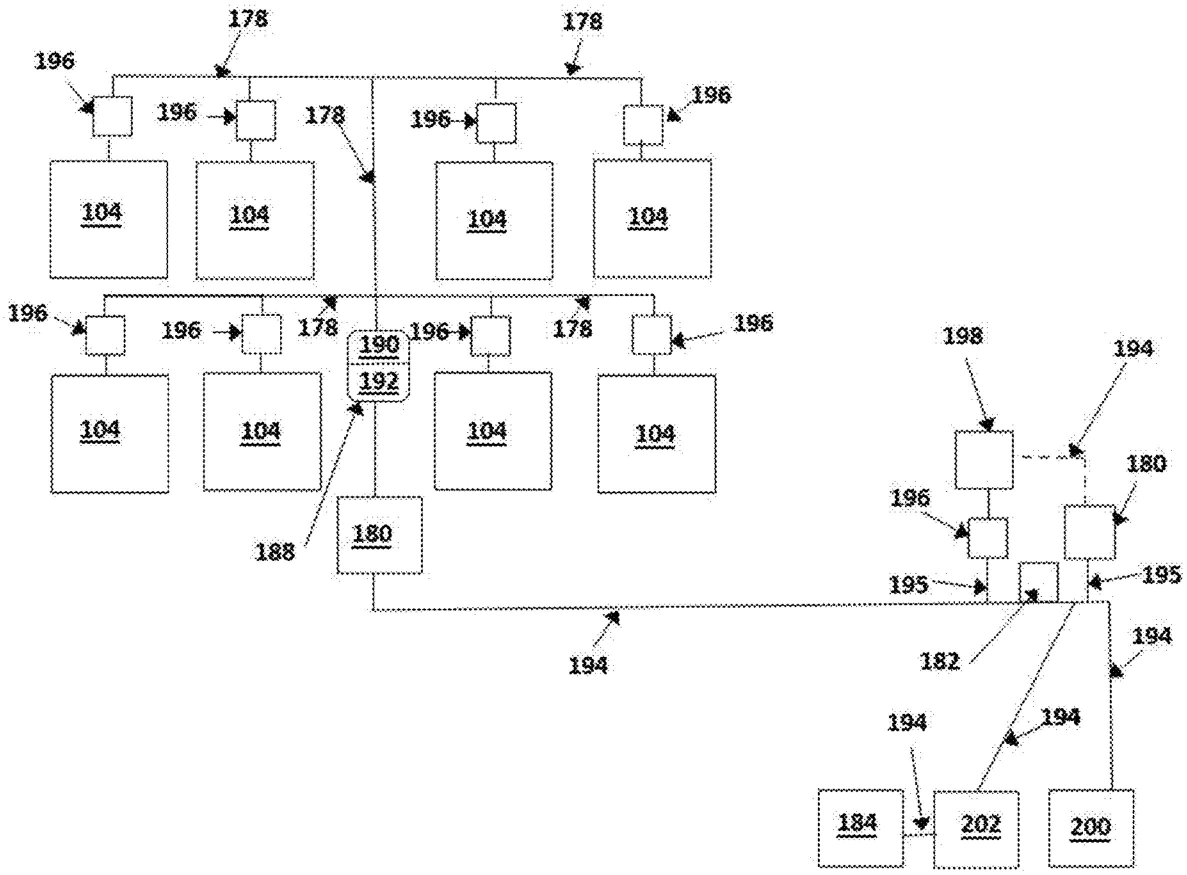
FIG. 27 is a block diagram of yet another configuration of electrical power produced by eight generators of the power supply apparatus and transmitted for use.

In another example, as shown in FIG. 27, an upper set and a lower set of generators 104 (each set are 4 generators 104) are connected in the same manner as shown and described above for FIG. 26. Each generator 104 of both sets is connected directly to an AC-DC converter 196 via a conductor 178. The conductor 178 is connected to each AC-DC converter 196 which connects to the conductor 178 of the upper set and another conductor 178 connects to the lower set, with both conductors 178 converging together to provide one conductor 178 to the first portion 190 of the slip ring 188. A conductor 194 extends from the second portion 192 of the slip ring 188 and connects to an inverter 180 (with or without a charge controller). The conductor 194 extends from the inverter 180 to carry the current to a branching conductor 195 which extends to an AC-DC converter 196 and then to a power storage 198 (which may be interconnected), while the conductor 194 continues through a filter or AC filter 182 and a branching conductor 195 carries the current to a transformer 202 (which connects with the electric grid 184) and a branching conductor 195 carries the current via to in inverter 180 and the current is carried by the conductor 194 to an end user 200.

Figure 28:
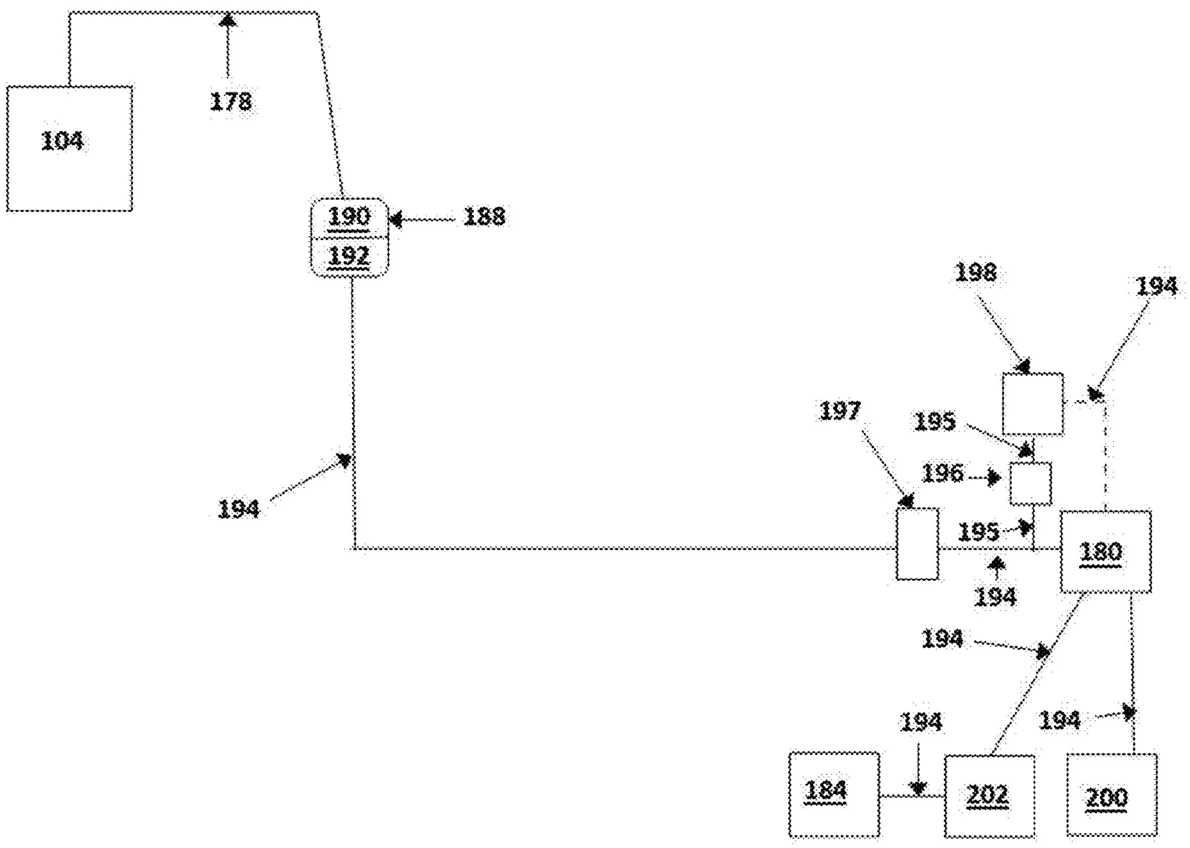
FIG. 28 is a block diagram of still a further configuration of electrical power produced by one generator of the power supply apparatus and transmitted for use.

In another example, FIG. 28 illustrates one generator 104 connected via conductor 194 through a slip ring 188 to a controller 197 and then to an inverter 180 and then via a branch conductor 195 to an AC-DC converter 196 thru a branch conductor 195 which extends to power storage 198 (with or without a charge controller). Additionally, the conductor 194 extending from the controller 197 that connects to an inverter 180, in turn connects to both an end user 200 and to a transformer 202 via additional conductors 194, and from the transformer 202 to the electric grid 184.

Figure 29:
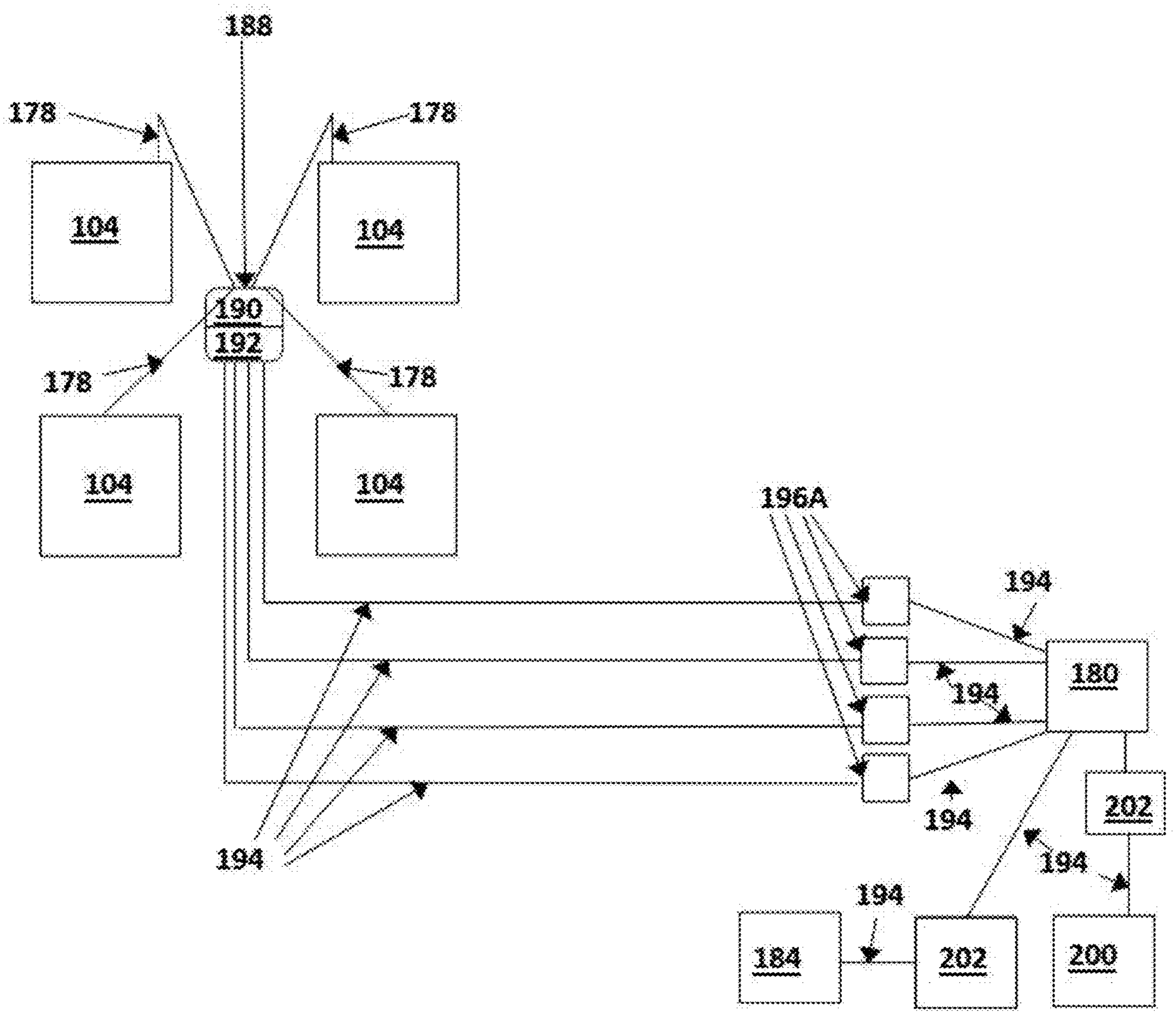
FIG. 29 is a block diagram of an additional configuration of electrical power produced by four generators of the power supply apparatus and transmitted for use.

In still another example, FIG. 29 illustrates four generators 104 producing AC power, with at least one conductor 178 connected to each generator 104. Each conductor 178 extends to the first portion 190 of the slip ring 188. At least four conductors 194 extend from the second portion 192 of the slip ring 188 and one of each conductor 194 connects to one of the four controllers 197, respectively. The four controllers 197 connect to an inverter 180 via conductors 194. From the inverter 180, the current is carried via conductor 194 to a step up or step-down transformer 202 to an end user 200, as well as through a conductor 194 to an additional transformer 202 when power is carried to the electric grid 184.

Turning back to the power generation apparatus 10, the inlet funnel 12 desirably may be 8-16 feet in the largest diameter, and the outlet funnel 16 may be approximately equal to the greatest diameter of the inlet funnel 12, but the largest diameter opening 18 of the inlet funnel 12 may also be larger or smaller than 8-16 feet, and when it is, the largest diameter of the outlet funnel 16 can increase or decrease as described herein. The largest diameter of the outlet funnel 16 can be configured with protruding items (not shown) so that when wind/airflow 56 strikes the items, vortexes are formed in the vicinity; these vortexes are considered low pressure zones. That is, the wind/airflow exiting the wide end 34 of the outlet funnel 16 has a higher pressure and accelerates as it is drawn toward these low-pressure vortexes. Protruding items causing vortexes to form can be any shape or size with or without space in between protrusions. Of course, the smaller diameter of the inlet funnel 12 and the outlet funnel 16 will desirably each conform to the diameter of the wind turbine unit 14, which is desirably of a consistent diameter throughout. The power generation apparatus 10 may be of any size, larger or smaller, and a large size may be used for industrial/commercial purposes, while a smaller size may be used for a single-family home. However, any size of power generation apparatus 10 may be used so long as it operates as shown and/or described herein.

Wind/airflow that is of too high speed can be detrimental, because it could be accelerated up to and beyond hurricane force wind and therefore may cause damage and/or destroy components of the power generation apparatus 10 and/or power generation system 42. As described earlier, the sail 120 may cause the inlet funnel 12 to rotate upward or downward to reduce or eliminate wind/airflow into the wind turbine unit 14, and into the inlet funnel 12, in order to protect the components of the power generation apparatus 10 and all other components of the power generation system 42. But in some instances, when winds are steady and not extreme, for example, but not by way of limitation, at 20 mph, acceleration by the inlet funnel 12 into the wind turbine unit 14 to 4-5 times that speed may still be damaging. In these circumstances, several actions may be helpful to control over-acceleration of the turbine blades 82 and generator 104 of the wind turbine unit 14. An additional or different diffuser 94 may be positioned at the entrance to the wind turbine unit 14 and/or inside of and/or over the opening 18 of the inlet funnel 12 or at the narrow end 24 of the inlet funnel 12. A diffuser 94 limits excessive wind/airflow 56 from entering or passing through the wind turbine unit 14, because the apertures of the diffuser limit how much wind/airflow 56 can squeeze through a diffuser at any given time. As previously mentioned herein, a dump load (not shown) may also desirably be configured to prevent the one or more generator(s) 104 from over-spinning and otherwise being damaged.

The number of turbine blade units 76 may be reduced as well. In some instances, the inlet funnel 12 may be removed, but due to its protective rotation to block damaging high winds from the wind turbine unit 14, this may be less desirable than other solutions. Each location and usage will likely have a different wind/airflow conditions and weather. Therefore, consideration of various factors, such as height and location of the tower 40, length of the horizontal support arm 38, number of power generation apparatus 10 connected to each horizontal support arm 38 on each tower 40 will need to be considered, as well as local wind/airflow and weather. Some experimentation may be needed at first to determine the best manner to harness the most power while limiting damage or required maintenance of parts. This type of experimentation is routinely needed in the wind/airflow harvesting industry. Therefore, those having ordinary skill in the art will appreciate that the foregoing are only some of the issues to consider and the possible solutions thereto, and may arrive at other solutions from the information provided herein.

With regard to manufacturing the inlet funnel 12 and outlet funnel 16, these items may be produced in sections, for example, they may be produced in halves, or thirds, or quarters, or other sections selected by one having skill in the art, because this makes the inlet funnel 12 and outlet funnel 16 easier to transport, and can also simplify manufacturing and lower costs. The sections can then be assembled and fastened together at a job site or elsewhere before being installed for operation.

Turning back to the power generation apparatus 10; the sections of the inlet funnel 12, the wind turbine unit 14, and/or the outlet funnel 16 facing falling frozen precipitation may be covered in a material or coating such as silicon, non-stick polymer, Teflon™ or other materials known in the art and commercially available. At least the sections of the inlet funnel 12, wind turbine unit 14, and outlet funnel 16 facing the falling precipitation may incorporate one or more conductors or resisters (not shown) that conduct heat and are connected to electrical current source(s) to convert electricity to heat to prevent or remove snow and ice buildup. In addition, the side of the conductors and/or resisters in contact with the inlet funnel 12, wind turbine unit 14, and/or the outlet funnel 16 and other items of the power generating system 43, may be insulated or sit on an insulator (not shown) that prevents the inlet funnel 12, wind turbine unit 14, and outlet funnel 16 and other items of the power generating system 43 from being damaged by heat produced by the conductors and or resisters, and the insulating material may be rubber, foam, glass, or any material(s) known in the art and are commercially available. In another alternative, there may be one or more apertures (not shown) in the lower sections of the inlet funnel 12, wind turbine unit 14, and outlet funnel 16 that allow water or precipitation to drain out or escape.

The power generating apparatus of the present invention may be installed, for example, but not by way of limitation, along highways, streets, roads, sidewalks, walkways, fields, farms, open land, golf courses, parks, shorelines, on or along piers, in or around marinas, along rivers, streams, lakes, ponds, on or within any bodies of water. The power generation apparatus may also, in this continuing non-limiting example, be installed on or near airport lands, in ports, along railroad tracks, on or along golf courses, affixed to bridges, on hills, mountains, in place of flag poles, in place of cellular or radio towers or other towers, in parking lots, between high rise buildings, on top of existing buildings or structures, in countless locations in suburban, urban, or rural areas, or any other locations selected by one of ordinary skill in art.

The power generation apparatus 10 and the power generation system 42 may be used in areas where there is considerable exhaust produced from other equipment or machinery. For example, but not by way of limitation, data centers, crypto-currency mining centers, and the like, may use commercial air conditioner units that include condensers which may provide considerable exhaust. Such exhaust will provide a controlled wind/airflow so that power may be generated from this unused exhaust. Other examples of such use will be apparent to those of ordinary skill in the art.

A kit for homeowners or small businesses may be created using the power generation apparatus 10, so that regular homeowners or small businesses could more affordably obtain electricity from harnessing wind/air flow through the power generation unit 10. The kit could either be installed by the buyers of the kit or other qualified professionals.

The foregoing is considered as illustrative only of the principles of the disclosure. Further, since numerous modifications and changes will readily occur to those of ordinary skill in the art, it is not desired to limit the disclosure to the exact construction and operation shown and described, and accordingly, all suitable modifications and equivalents may be resorted to and fall within the scope of this disclosure.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112(f).

The invention claimed is:

1. A power generation apparatus, including a wind turbine unit including a first end having an opening formed therethrough and having one or more wind turbine blade units rotatably carried within the wind turbine unit, the one or more wind turbine blade units configured to rotate when wind/airflow moves through the wind turbine unit, each turbine blade unit of the one or more turbine blade units operably connected to a generator to generate electricity when the one or more wind turbine blade units rotate; and an inlet funnel axially aligned with the first end of the wind turbine unit when in an operative position and pivotably carried to move into and out of the operative position relative to the first end of the wind turbine unit, the inlet funnel formed to remain in the operative position until increased wind/airflow causes the inlet funnel to pivot out of the axial alignment and out of the operative position such that at least a portion of the wind/airflow is redirected and reduced from entering the wind turbine unit.

2. The power generation apparatus of claim 1, wherein the one or more wind turbine blade units further comprises at least two wind turbine blade units, and at least one wind turbine blade unit of the at least two wind turbine blade units includes a diffuser positioned axially in front of the at least one wind turbine blade unit of the two wind turbine blade units.

3. The power generation apparatus of claim 2, wherein the at least two wind turbine blade units are rotatably mounted on a central shaft which operably connects to the generator.

4. The power generation apparatus of claim 1, wherein the housing includes a second end, and the power generation apparatus further comprises an outlet funnel axially aligned with the second end of the housing.

5. The power generation apparatus of claim 4, wherein the outlet funnel is pivotally connected to the wind turbine unit.

6. The power generation apparatus of claim 1, wherein a sail is positioned over at least a portion of an opening in the inlet funnel, and wherein when too much wind/airflow contacts the sail, the pressure of the wind/airflow against the sail and the inlet funnel causes the inlet funnel to pivot out of axial alignment with the wind turbine unit.

7. The power generation apparatus of claim 6, wherein the sail is used to calibrate pivotal movement of the inlet funnel via the number of openings in the sail, the location of the sail relative to the inlet funnel, and the amount of the sail used with the inlet funnel.

8. The power generation apparatus of claim 1, wherein one or more air foils are mounted adjacent the second end of the wind turbine unit.

9. The power generation apparatus of claim 1, wherein the one or more wind turbine units are carried on a horizontal support arm.

10. The power generation apparatus of claim 9, wherein the horizontal support arm is carried by a tower.

11. The power generation apparatus of claim 9, wherein the horizontal support arm is connected to a hub which rotates.

12. The power generation apparatus of claim 11, wherein the hub and bearing plate are carried by a tower.

13. The power generation apparatus of claim 9, wherein the horizontal support arm further comprises at least one rudder.

14. The power generation apparatus of claim 9, wherein the horizontal support arm operably connects to a landing gear.

15. The power generation apparatus of claim 1, wherein the one or more wind turbine blade units are rotatably mounted on a central shaft which operably connects to the generator, and wherein a conductor extends from each generator to an upper portion of a single slip ring used with each separate horizontal support arm.

16. The power generation apparatus of claim 1, wherein at least one of the inlet funnel and the wind turbine unit includes a diffuser.

17. The power generation apparatus of claim 16, wherein the diffuser is formed to include a plurality of openings therein.

18. The power generation apparatus of claim 17, wherein the diffuser turns wind/airflow with vortices into laminar wind/airflow.

19. The power generation apparatus of claim 18, wherein the diffuser is used to increase or decrease wind/airflow through the at least one of the inlet funnel and the wind turbine unit.

20. The power generation apparatus of claim 1, wherein the inlet funnel is pivotally connected to the wind turbine unit.

* * * * *